US 6,671,356 B2

(12) United States Patent
Lewis

(10) Patent No.: US 6,671,356 B2
(45) Date of Patent: Dec. 30, 2003

(54) MULTI-MEDIA COMMUNICATION MANAGEMENT SYSTEM WITH SUBSCRIBER MESSAGING INTEGRATION SERVICES

(75) Inventor: Calvin E. Lewis, Copley, OH (US)

(73) Assignee: Teleware, Inc., Akron, OH (US)

( * ) Notice: Subject to any disclaimer, the term of this patent is extended or adjusted under 35 U.S.C. 154(b) by 0 days.

(21) Appl. No.: 10/165,890

(22) Filed: Jun. 10, 2002

(65) Prior Publication Data

US 2003/0059003 A1 Mar. 27, 2003

Related U.S. Application Data

(63) Continuation-in-part of application No. 10/000,543, filed on Oct. 23, 2001, and a continuation-in-part of application No. 09/961,532, filed on Sep. 24, 2001.

(51) Int. Cl.[7] ................................................. H04M 1/64
(52) U.S. Cl. ................ 379/88.13; 379/67.1; 379/88.12; 379/88.17; 379/88.18; 379/88.22; 379/88.25
(58) Field of Search ........................... 379/67.1, 68, 72, 379/76, 88.04, 88.12, 88.13, 88.17, 88.18, 88.22, 8.25; 455/412, 413, 417, 445, 461

(56) References Cited

U.S. PATENT DOCUMENTS

| | | | | |
|---|---|---|---|---|
| 5,608,786 | A | * | 3/1997 | Gordon ........................ 379/100 |
| 5,655,015 | A | | 8/1997 | Walsh et al. |
| D389,146 | S | | 1/1998 | Tan |
| 5,742,905 | A | * | 4/1998 | Pepe et al. .................... 455/461 |
| 5,870,549 | A | * | 2/1999 | Bobo, II .................. 395/200.36 |
| 6,188,677 | B1 | | 2/2001 | Oyama et al. |
| 6,233,318 | B1 | * | 5/2001 | Picard et al. ............. 379/88.17 |
| 6,240,168 | B1 | | 5/2001 | Stanford et al. |
| 6,330,244 | B1 | | 12/2001 | Swartz et al. |
| 6,366,653 | B1 | | 4/2002 | Yeh et al. |
| 6,389,005 | B1 | | 5/2002 | Cruickshank |
| 6,396,907 | B1 | | 5/2002 | Didcock |
| 6,424,711 | B1 | | 7/2002 | Bayless et al. |
| 6,429,855 | B2 | | 8/2002 | Pabon et al. |
| 6,487,278 | B1 | * | 11/2002 | Skladman et al. ....... 379/88.13 |
| 2002/0085535 | A1 | | 7/2002 | Williams |
| 2002/0086702 | A1 | | 7/2002 | Dimenstein et al. |

OTHER PUBLICATIONS

Symbol Technologies, Press Release, Symbol Announces Wireless LAN Telephone System. Jan. 19, 1998.

* cited by examiner

*Primary Examiner*—Allan Hoosain
(74) *Attorney, Agent, or Firm*—Timothy P. O'Hagan

(57) ABSTRACT

The multi-media communication management system comprises a controller that interfaces with a subscriber station that includes an interface for coupling to a subscriber device. The subscriber device receives subscriber emails over a wide area network communication link to an email server. The system comprises a email interface system for establishing communications with a remote email server coupled to a service provider network and receiving subscriber emails directed to the remote email server and a subscriber device email interface system for establishing communications with the subscriber station at which a subscriber device is coupled and receiving subscriber emails that were provided to the subscriber device over the wide area network. The system generates inbox content and provides the inbox content to the subscriber station for display on a display associated with the subscriber station. The inbox content comprises both subscriber emails provided to the subscriber device and subscriber emails directed to the remote email server.

30 Claims, 21 Drawing Sheets

245 — Subscriber Identifier 246

| Subscriber ID | Subscriber Name | Subscriber Device ID Code | Current Network Address |
|---|---|---|---|
| 1234 | Bob | 001 | 192.168.abc.xyz |
| 1235 | Chris | 002 | 192.168.def.uvw |
| 1236 | Marvin | 003 | Open |
| . | . | . | . |
| . | . | . | . |
| . | . | . | . |

Current Network Address Table

249 — Address Book

| Group Name | Members | Contact Information |
|---|---|---|
| All Campus | Annette, Bill, Cindy, Dan, Elain . . . | xxxxx |
| Building A | Annette, Bill, Homer, Irene | xxxxx |
| . | . | |
| . | . | |
| Annette | Annette | Email, Telephone, etc. |

Figure 9b

MULTI-MEDIA COMMUNICATION MANAGEMENT SYSTEM WITH SUBSCRIBER MESSAGING INTEGRATION SERVICES

CROSS REFERENCE TO RELATED APPLICATIONS

The present application is a continuation in part of U.S. patent application Ser. No. 09/961,532 titled Teledata Space and Docking Station with Modular and Integrated Display filed on Sep. 24, 2001, and is a continuation in part of U.S. patent application Ser. No. 10/000,543 filed on Oct. 23, 2001, titled Modular Multi-Media Communication Management System, the contents of both such patent applications is incorporated herein.

TECHNICAL FIELD

The present invention relates generally to managing multi-media communications, and more particularly to a modular system for managing a subscribers messaging content from a plurality of messaging service sources.

BACKGROUND OF THE INVENTION

In today's office environment, it is common for a person to rely on a combination of communication devices for their multi-media communication needs. For example, a person may utilize a desk top telephone, a voice mail system, a mobile telephone, a cellular telephone, a fax machine, a wireless pager, and a building wide or campus wide loud speaker paging system (either overhead loud speakers or through the loud speaker in each desk top telephone), and an e-mail system.

Each of the above listed systems is tailored to provide a convenient system for providing certain types of communications but is unsuited for other types of communications. For example, the e-mail system and the fax machine are convenient for written communication but are unsuited for a real time voice conversation.

The desk top telephone is well suited for providing a high quality of service voice conversation but is unsuited for providing voice conversation when the user is not at their desk. On the other hand, a mobile telephone or cellular telephone is well suited for providing voice conversation to a mobile user, but the quality of service is typically not as high as the quality of service of the desk top telephone.

When a subscriber receives an incoming call on the desk top telephone and the subscriber does not answer the desk top telephone, the caller may leave a message on a voice mail system associated with the desk top telephone service provider voice mail system.

If the subscriber receives an incoming call on the mobile telephone, (even if the subscriber is located at the desk top telephone) the subscriber is required to answer the call using the mobile telephone. If the subscriber does not answer the mobile telephone, the caller may leave a message on a mobile telephone voice mail system for the subscriber to retrieve at a later time.

A similar situation occurs with a subscriber's email. If a subscriber chooses to access his or her Internet Mail account from both a wireless personal data assistant (either a PDA operating in a wide area data network or a PDA embodied in a cellular or PCS telephone) there exist few systems to assure that email messages are available to the subscriber on both devices.

Internet Mail clients can be configured to either remove email from an Internet Mail server after downloading the email to a local folder or to leave the email on the Internet Mail Server after downloading. If either device is configured to remove messages, the other device may not receive a removed message. If neither device removes messages, the Internet Mail server capacity will soon be reached. To assure message content is available on both devices, the operator must occasionally synchronize the email files of the two devices.

Private mail server systems such a MicroSoft Exchange® and Lotus Notes® may provide a single email file that enables subscriber access from multiple devices. However, access from a wide area wireless device is complicated by the fact that normal Internet mail protocols are not used and a customized virtual private network connections over the wide area network may be necessary to properly secure the private mail server and, the size of the data files that need to be transferred between the private mail server and the wireless device at login may be greater than required by an Internet Mail server system.

What is needed is a multi-media communication management system for managing a subscribers messaging content from a plurality of messaging service sources that does not suffer the disadvantages of the known systems.

SUMMARY OF THE INVENTION

A first aspect of the present invention is to provide a multi-media communication management system for operation with a subscriber station that includes an interface for coupling to a subscriber device. The subscriber device is capable of receiving subscriber emails over a wide area network communication link to an email server. The multi-media communication management system comprises a network communication circuit for communication with the subscriber station and a service provider network interface for communication with a service provider multi-media communications network.

A subscriber device email interface establishes communications with the subscriber station at which a subscriber device is coupled and receives subscriber emails provided to the subscriber device over the wide area network communication link.

A subscriber email client comprises both: a) means for establishing communications with a remote email server coupled to the service provider network and receiving subscriber emails directed to the remote email server; and b) means generating inbox content comprising subscriber emails provided to the subscriber device and subscriber emails directed to the remote email server.

The system may further comprises an email storage file in which the inbox content may be stored by the system and means for providing the inbox content to the subscriber station for display on a display associated with the subscriber station. The inbox content may be provided as an HTML document that includes the content in a layout format selected from one of a plurality of layout formats suitable for display or may be provided in association with a style sheet selected from one of a plurality of style sheets suitable for display. The display may be the display of the subscriber device and the system may provide instructions to the subscriber station to display the content on the subscriber device.

For a better understanding of the present invention, together with other and further aspects thereof, reference is made to the following description, taken in conjunction with the accompanying drawings, and its scope will be pointed out in the appended clams.

BRIEF DESCRIPTION OF THE DRAWINGS

FIGS. 9a is a table diagram representing a current network location table in accordance with one embodiment of the present invention;

FIG. 9b is a table diagram representing a multicast group table in accordance with one embodiment of the present invention;

DESCRIPTION OF THE PREFERRED EMBODIMENTS

Figure 1:
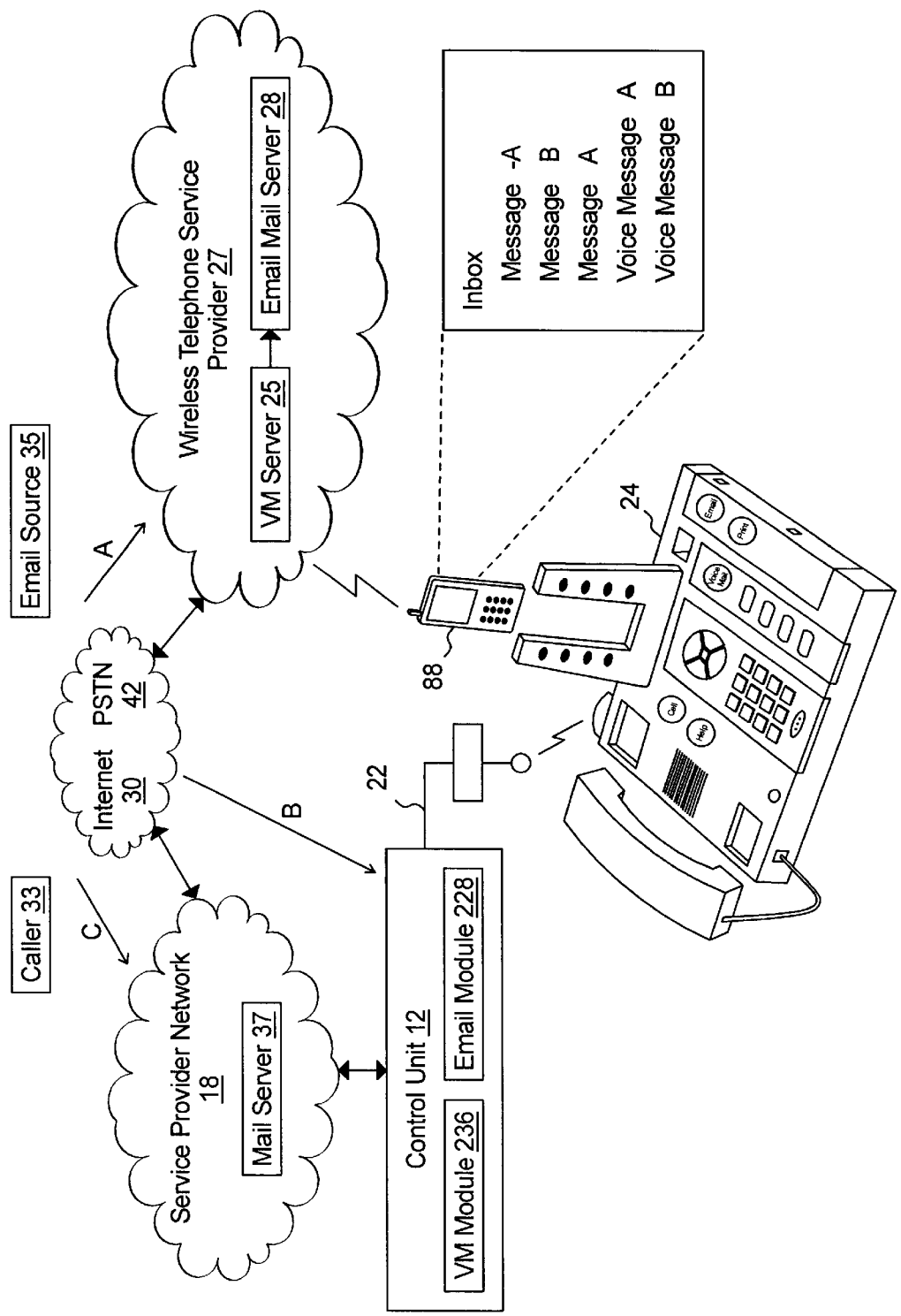
FIG. 1 is a bock diagram showing an exemplary embodiment of the present invention.

The present invention is now described in detail with reference to the drawings. In the drawings, each element with a reference number is similar to other elements with the same reference number independent of any letter designation following the reference number.

It should also be appreciated that many of the elements discussed in this specification may be implemented in hardware circuit(s), a processor executing software code, or a combination of a hardware circuit and a processor executing code. As such, the term circuit or module as used throughout this specification is intended to encompass a hardware circuit (whether discrete elements or an integrated circuit block), a processor executing code, or a combination of a hardware circuit and a processor executing code, or other combinations of the above known to those skilled in the art.

The block diagram of FIG. 1 represents an overview of the present invention. The present invention facilitates integration of subscriber audio messages and email messages.

A caller using a remote calling device 33 (which may be either a Voice-over-IP (VOIP) device coupled to the Internet 30 or may be a circuit switched telephone (or telephone system) coupled to the PSTN 42) may place a telephone call to a subscriber by calling a number that will route (routing A) to a wireless telephone service provider 27 which in turn is routed to the subscriber's mobile telephone 88. In the event that the subscriber does not answer the telephone call, a voice mail server 25 controlled by the wireless telephone service provider system 27 will answer the call and prompt the caller using the remote calling device 33 to leave a message for the subscriber.

Alternatively, the caller using the remote calling device 33 may place a telephone call to the subscriber by calling a number that will route to a control unit 12 over either the PSTN 42 (routing B) or over the Internet 30 and the service provider network 18 (routing C). In turn, the telephone call will be routed by the control unit 12 to the subscriber station 24 at which the subscriber's mobile telephone 88 is then currently coupled. In the event that either the subscriber does not answer the telephone call or in the event that the subscriber's mobile telephone 88 is not then currently docked at any subscriber station 24 operating under control of the control unit 12, a voice mail module 236 associated with the control unit 12 will answer the call and prompt the caller using the remote calling device 30 to leave a message for the subscriber.

A user of a remote email source 35 coupled to the Internet 30 may send an email addressed to a subscriber's email account associated with the wireless telephone service provider 27. Such email will be received by the wireless telephone service provider's email server 28 and subsequently made available for download to and viewing on the wireless telephone 88.

Additionally, the user of the remote email source 35 may send an email addressed to a subscriber's email account associated with the service provider 18 or the control unit 12. Such email will be received by a mail server 37 associated with the service provider network 18 (e.g. the mail message is addressed to an email URL that routes to the mail server 37). The email will be subsequently downloaded into a memory associated with an email module 228 of the control unit 12 and made available for subscriber viewing on a display screen associated with the subscriber station 24 at which the subscriber's wireless telephone 88 is then currently coupled.

While both voice mail module 236 or the voice mail server 25, as is traditional, enable the subscriber to call the module 236 or the server 25 to obtain messages stored on the module 236 or the server 25, both are also configured to save each message as an audio file, attached the audio file to an email that includes statistics about the message (such as time of call, duration, and caller ID information), and send the email. The email from the voice mail module 236 is sent to the email module 228 and the email from the voice mail server 25 is sent to the email server 28.

As such, when the subscriber accesses his or her email messages from the email module 228, the email messages will include both emails sent from the remote email source 35 and voice mail messages left by the caller using the remote calling device 33 on the voice mail module 236. Similarly, when the subscriber accesses his or her email messages from the email module 28, the email messages will include both emails sent form the remote email source 35 and voice mail messages left by the caller using the remote calling device 33 on the voice mail server 25.

To further integrate messaging, the email module 228 is configured to establish communications with the subscriber station 24 at which the subscriber's wireless telephone 88 is coupled and to obtain subscriber emails provided to the wireless telephone from the email server 28. The email module 228 then combines such emails with emails in the subscriber's inbox as provided by the mail server 37 and the voice mail module 236 and generates inbox content comprising subscriber emails addressed to the mail server 37, subscriber emails addressed to the email server 28, subscriber voice mail messages left on the voice mail module 236, and subscriber voice mail messages left on the voice mail server 25. The inbox content is then provided to the subscriber station 24 for display on a display associated with the subscriber station. The display may be the display on the wireless telephone 88.

Figure 2:
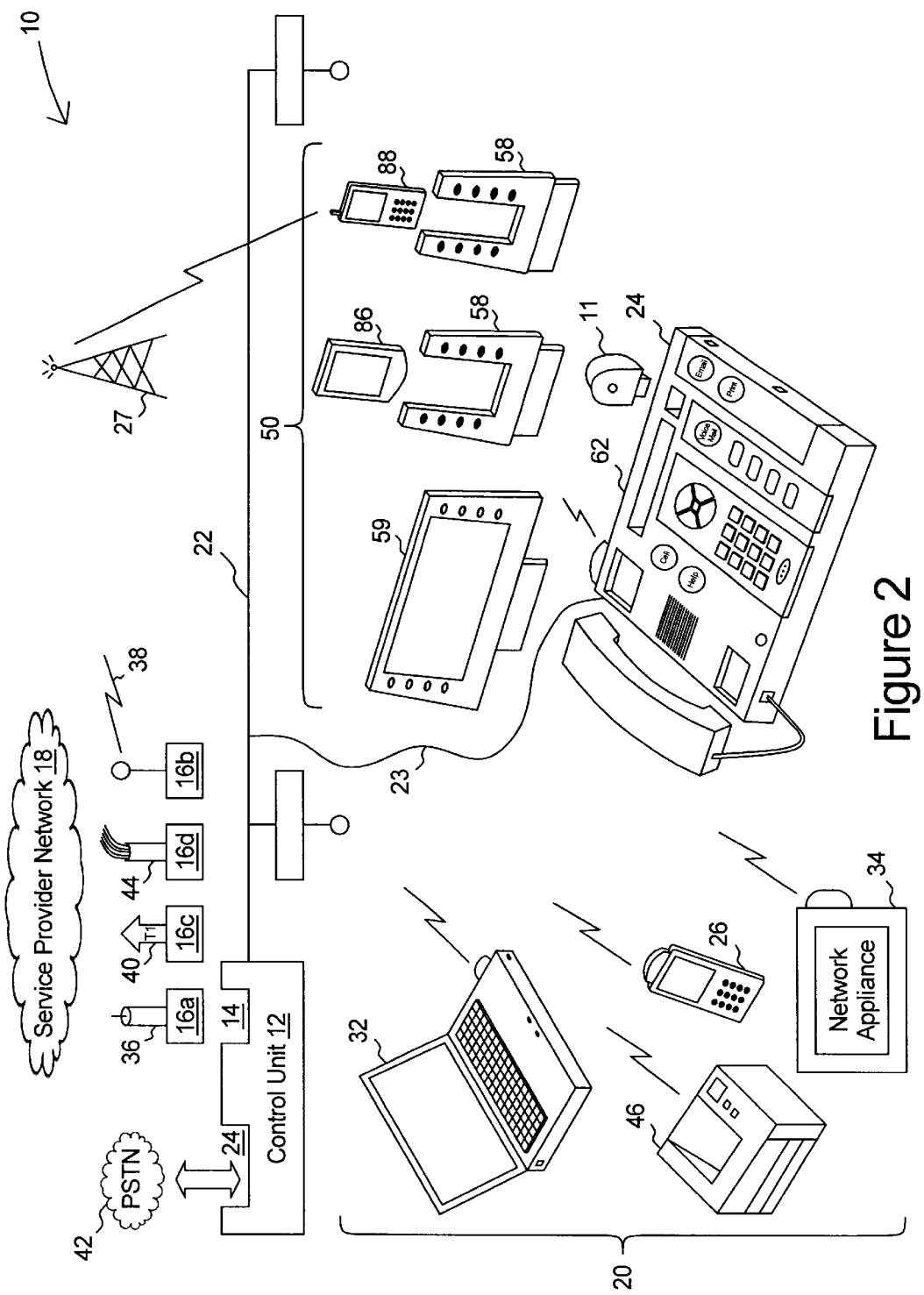
FIG. 2 is a block diagram view of a modular multi-media communication management system in accordance with one embodiment of the present invention.

Referring to FIG. 2, an exemplary architecture of the multi-media communication management system 10 of the present invention is shown. The multi-media communication management system 10 includes a control unit 12 that is coupled with a plurality of local communication devices 20 over a wireless local area network 22 (or by a wired network connection 23 to the backbone wired network of the wireless local area network 22). The local communication devices 20 may include: subscriber stations 24, wireless dialog handsets 26, traditional computer systems 32, network printers 46, and various network appliances 34.

Also included in the multi-media communication management system 10 are a plurality of subscriber devices 50, each of which may be coupled to a docking bay 62 of the subscriber station 24 or to a modular docking interface 58 which in turn couples to the docking bay 62. Exemplary configurations for the subscriber device 50 include: a) a subscriber data assistant 86; b) a wireless telephone or wireless telephone/subscriber data assistant combination device 88; c) a display screen 59; and d) the wireless dialog handset 26. Each subscriber device 50 is discussed in detail herein.

The control unit 12 includes a circuit switched provider bay 24 which operatively couples the control unit 12 to one or more subscriber loops of the public switched telephone network (PSTN) 42 and includes a multi-media communication service provider bay 14 which operatively couples the control unit 12 to a multi media service provider's network 18 through one of a plurality of communication medium modules 16a–16d.

In the exemplary embodiment, the service provider's multi-media communication network 18 may utilize the Internet Protocol Suite for communication at the IP level, but may be proprietary at the data link and physical layers. As such, the control unit 12 includes the IP stacks applicable for communication between applications over the network 18 and each module 16a–16d includes the applicable data link and physical layer circuits for communication of IP frames over the physical medium of the network 18.

Some illustrative examples of communication modules include: communication module 16a which may be a cable modem module for communicating over coaxial cable 36 with a multi-media communication service provider such as a local cable company, communication module 16b which may be a wide area network radio for communication over a wireless spectrum channel 38 with a wide area wireless multi-media communication service provider such as an analog or digital cellular/PCS telephone service provider, communication module 16c which may be a customer service unit (CSU) for communication over a T1 line 40 with a multi-media communication provider such as a local telephone service provider, and communication module 16d which may be an optical modem for communication over a fiber channel 44 with a fiber optic multi-media communication service provider.

In operation, the control unit 12 integrates and manages multi-media communication between two or more local communication devices 20 and between each local communication device 20 and a remote communication system(s) (not shown) coupled to either the service provider's multi-media communication network 18 or the PSTN 42.

Figure 3:
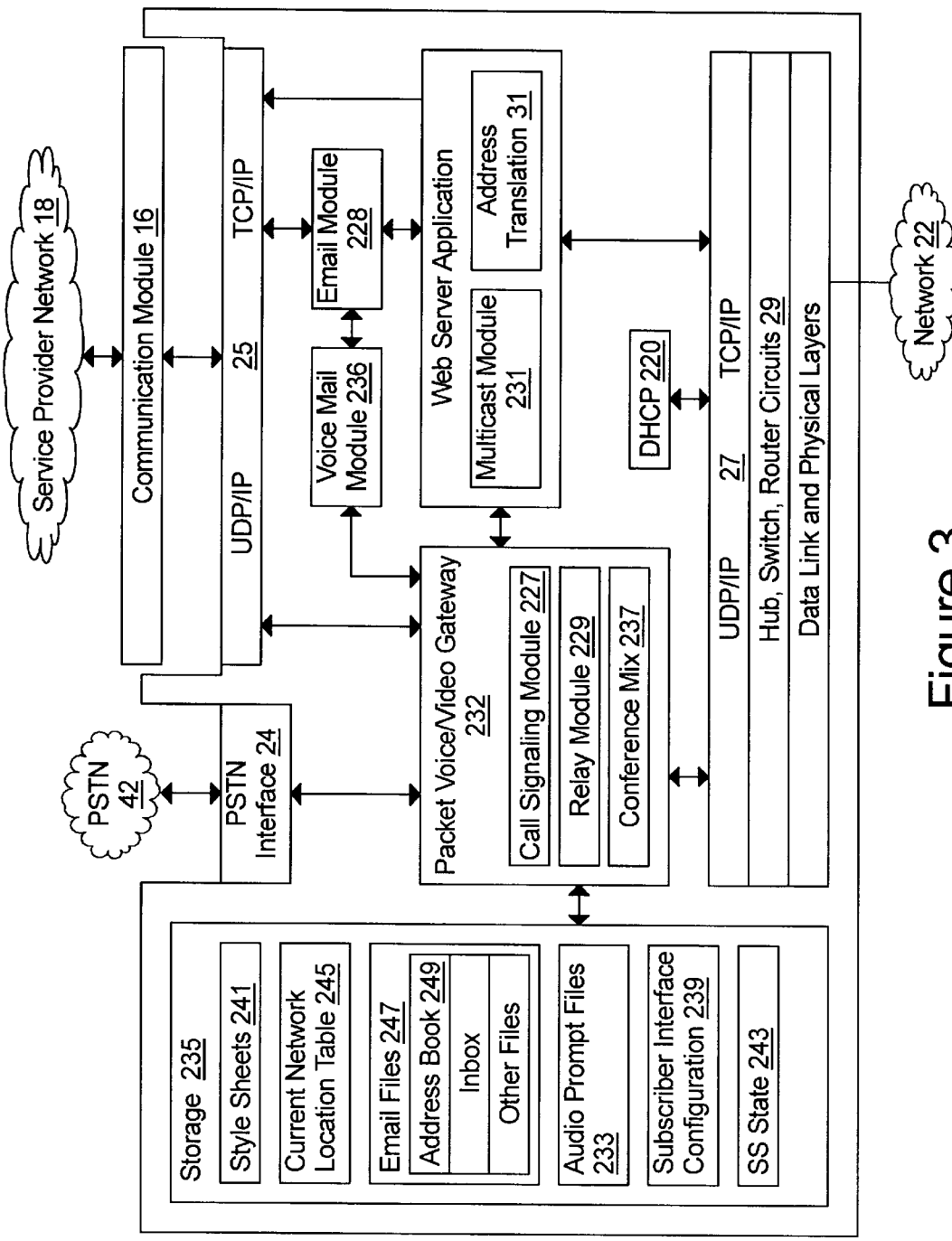
FIG. 3 is a block diagram of a multi-media communication management system controller in accordance with one embodiment of the present invention.

FIG. 3 shows a block diagram of an exemplary control unit 12. The control unit 12 includes applicable modules for managing the local area network 22 as an IP network. Such modules may include an applicable combination of hubs, routers, and switches 29 for managing communications over the network 22 as well as an address server 220 (e.g. DHCP server) for assigning local IP addresses to each local communication device 20.

The control unit 12 may also include a packet audio/video gateway 232, a voice mail module 236, an email module 228, and a web server application 230. The packet audio/video gateway 232 provides a subscriber's real time full duplex audio communication and audio/video communication services. The services may include routing and maintaining a subscriber's outgoing calls and incoming calls. A subscriber's outgoing calls may comprise audio calls, audio/visual calls, and multiparty conference calls (either audio or audio/visual) that are originated by a subscriber station 24 that is associated with the subscriber. The destination(s) may include remote packet audio/video devices coupled to the network 18, remote telephones coupled to the PSTN 42, or other subscriber's served the multi media communication management system 10. A subscriber's incoming calls may comprise calls (either audio or audio/visual) that are originated by a remote telephone device coupled to the PSTN 42, remote packet audio/visual devices coupled to the network 18, subscriber stations 24, or the audio/visual conference module 229 and identify the subscriber as the destination subscriber.

The packet audio/video gateway 232 communicates over the network 22 and the network 18 utilizing IP protocols. However, audio communication over the PSTN 42 utilizes analog or PSTN digital audio signals. As such, the control unit 12 includes a PSTN interface 24 that includes circuits for translating between PSTN call signaling (and analog or PSTN digital audio communication) to digital call signaling messages (and digital audio communication formats and protocols) for use by the packet audio/video gateway 232. Therefore, for the sake of simplicity, the discussion of the packet audio/video gateway 232 herein will refer to PSTN interface 24 as an originating or destination device with which an audio call may be established and maintained. However, it should be appreciated that the PSTN interface 24 is not the ultimate origination or destination but is operating to interface the packet audio/video gateway 232 to a telephone system on the PSTN 42 with which it could not communication directly.

The packet audio/video gateway 232 includes a call signaling module 227. The call signaling module 227 includes circuits for receiving call signaling messages from an originating device, identifying a destination device, providing call signaling messages to the destination device, and, if responded to by the destination device, negotiating compression algorithms and establishing channel usage for the relay of real time audio or audio/visual communications. In the exemplary embodiment call signaling utilizes defined protocols such as the H.323 protocols promulgated by the International Telephony Union (ITU) or the Session Initiation Protocols (SIP) promulgated by the Internet Engineering Task Force (IETF).

Figure 12A:
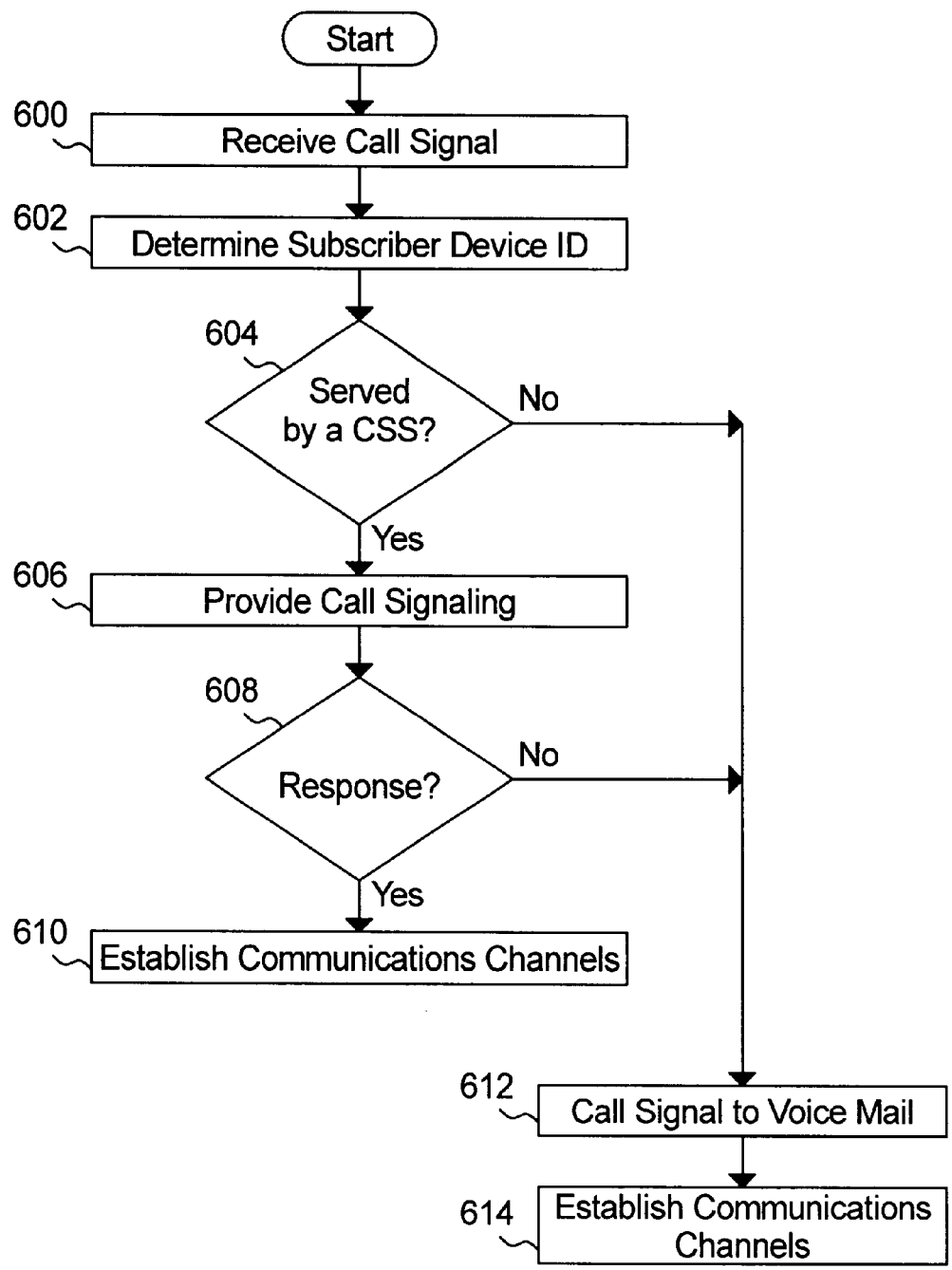
FIGS. 12a through 12c each show a flow chart representing exemplary operation of packet audio/video gateway in accordance with one embodiment of the present invention.
Figure 12C:
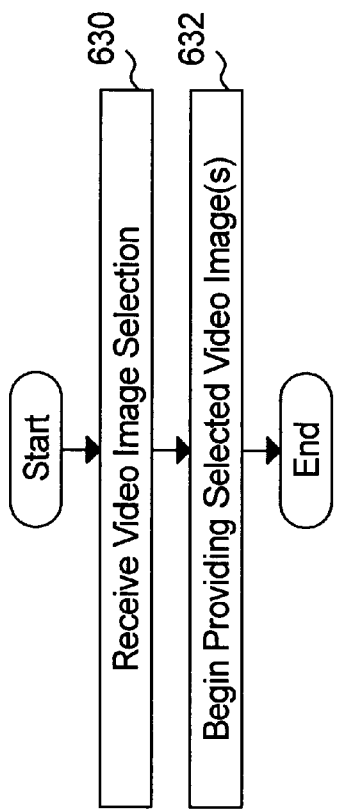
Figure 12B:
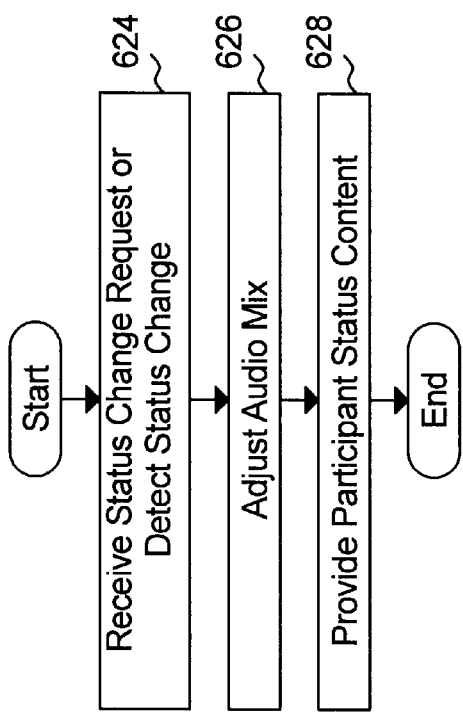

For inbound calls, the call signaling message provided by the originating device may identify a subscriber served the multimedia communication management system 10. The call signaling module attempts to identify the subscriber station 24 that is then serving the subscriber device 50 that is assigned to the identified subscriber. Referring to FIG. 12*a* in conjunction with the current network location table 245 of FIG. 9*a*, the process of identifying a destination device is shown.

Step 600 represents receipt of the call signaling message identifying the subscriber. In the exemplary embodiment, each subscriber will be assigned a four digit subscriber identifier number that may correspond to the last several digits of a PSTN direct dial number that routes to the PSTN interface 24 when dialed on the PSTN. As such, the call signaling message, whether provided by an originating device coupled to network 18, an originating device coupled to network 22, or the PSTN interface 24, may include the subscriber identifier number to identify the destination subscriber.

At step 602, the call signaling module identifies a subscriber device 50 (FIG. 2) that is associated with the identified subscriber utilizing the network location table 245. To associate each subscriber with his or her subscriber device 50, the network location table 245 includes a record for each subscriber. Within such record is a field that identifies the subscriber, identifies the subscriber identifier associated with the subscriber, and identifies a subscriber device ID code that is unique to the subscriber device 50 that is assigned to the subscriber.

At step 604 the call signaling module identifies whether the subscriber's subscriber device 50 is served by a subscriber station 24. The network location table 245 further includes a field that may comprise the network address of the subscriber station 24 that is then currently serving the subscriber device 50 assigned to the subscriber. The address within this field will be updated when the subscriber moves his or her subscriber device 50 from one subscriber station 24 to another using circuits and methods discussed herein. If the subscriber device is not currently served by any subscriber station 24, then the field will indicate such as represented by the term "open".

If at step 604, the call signaling module determines that the subscriber device 50 assigned to the subscriber is not currently served by any subscriber station 24, the voice mail module 236 becomes the default destination device to which call signaling is provided at step 612. However, if the subscriber device is served by a subscriber station 24, such subscriber station becomes the destination device to which call signaling is provided at step 606.

Step 608 represents the call signaling module determining whether the subscriber station 24 is responding to the call signaling. In certain events such as when the subscriber is already engaged in a telephone call or if the subscriber does not answer the inbound call, the subscriber station 24 will not respond to the call signaling. In which case, the voice mail module 236 will again become the default destination device to which call signaling is provided at step 612.

If the call signaling is responded to by the subscriber station 24, the call signaling module will negotiate compression algorithms and establish communication channels with both the subscriber station 24 and with the originating device to relay audio or audio/visual real time communications for the duration of the call.

If call signaling is provided to the voice mail module 236 at step 612, the call signaling module will negotiate compression algorithms and establish communication channels only to the originating device to relay audio real time communications between the voice mail module 236 and the originating device until the originating device is disconnected from the voice mail module.

Returning to FIG. 3, for outbound calls, the call signaling module may be provided with a number that represents the intended destination. The number may be a multi-digit number routable on the PSTN, a number identifying a person or station coupled to the network 18, or a subscriber ID representing a subscriber to the system 10. The call signaling module may identify the destination device first by determining whether the number represents a person or destination coupled to the network 18, a PSTN routable telephone number, or a subscriber. The call signaling module may refer to a directory within storage 235 that maps possible numbers to one of the three networks. It should be appreciated that a PSTN routable telephone number may also represent a person or station coupled to the network 18. As such, the directory within storage 235 may include a priority such that the call signaling model will attempt to establish call signaling utilizing network 18 as a first priority and the PSTN 42 as a second priority.

If the destination device is coupled to the network 18, the number may be permanently assigned to a person or a station, however, the IP network address utilized by the person or station may change periodically. As such, the call signaling module may query a remote directory server to determine the network address of the destination device or the network address of a proxy for the remote device. Call signaling is then provide to the destination device or the proxy. If the call signaling is responded to by the proxy or the remote device, the call signaling module will negotiate compression algorithms and establish communication channels with both the originating subscriber station 24 and with proxy or remote device for the relay of audio or audio/visual real time communications for the duration of the call.

If the destination device is coupled to the PSTN 42, the destination device is the PSTN interface 24 and call signaling is provided to the PSTN interface 24. Again, if the call signaling is responded to by the PSTN interface 24 (indicating that the call has been established on the PSTN 42) the call signaling module will negotiate compression algorithms and establish communication channels with the originating subscriber station 24 for the relay of real time audio communications between the subscriber station 24 and the PSTN interface 24 for the duration of the call.

If the destination device is a subscriber to the system 10, steps discussed above with respect to FIG. 12*a* are applicable.

For both inbound and outbound calls, the relay of real time audio or audio/video communications is provided by a relay module 229 within the packet audio/video gateway 232. The relay module 229 relays sequences of real time transport protocol (RTP) frames that include compressed audio data and compressed video communications over the channels established by the call signaling module 227.

The relay module 229 also relays real time audio/video communications for conference calls between each of the call participants and a conference mix module 237. The conference mix module 237 includes audio mixing circuits for receiving multiple audio streams to generate one or more conference mix signals. The conference mix module 237 provides the conference mix signals back to the relay module 229 for relay back to the conference session participants.

The voice mail module 236 includes circuits for responding to the call signaling provided by the call signaling module 227, providing a sequence of RTP frames representing applicable audio prompts from compressed audio prompt files 233 to the relay module 229, receiving RTP frames from the relay module 229 representing the voice of the remote caller leaving a message for the subscriber, compressing the message into a digital audio file. The voice mail message contained in the digital audio file can be retrieved in a traditional manner by calling into the voice mail server. Alternatively, the voice mail module 226 may send the digital audio file to the email module 228 for storage in the email files 247 for later retrieval by the subscriber. The digital audio file may be send directly to the email module 228 using messaging between the voice mail module 226 and the email module 228 or may be sent to the email server 37 for subsequent retrieval by the email module 228.

The email module 228 maintains an email account associated with each subscriber. The email module 228 includes client circuits for interfacing with a remote email server (such as email server 37 of FIG. 1) and with the voice mail module 226 (if the email messages containing the compressed audio files are messaged directly to the email module 228). The email module 228 logs onto an account associated with each subscriber at the email server 37, obtains new email messages associated with the subscriber for storing in the subscriber inbox, and sends email messages drafted by the subscriber to the remote server. The email module 228 also maintains the email files 247 in the storage 235 that may include an address book and the inbox for each subscriber.

The web server application 230 provides additional multi media communication services provided to each subscriber. Examples of the multi media communication services provided to each subscriber by the web server application 230 include: a) delivery of email and voice mail messages (as emailed audio files) to the subscriber station 24 at which the subscriber's subscriber device 50 is then currently coupled; b) updating of the network location table 245 to assure proper routing of incoming audio and audio/video calls; c) proxy communication over network 18; d) delivery of a multicast messages directed to a subscriber to the particular subscriber station 24 at which his or her subscriber device is then currently coupled; e) providing subscriber control of audio and audio/video conference calls through the packet voice gateway 232; and f) synchronizing email messages files between the email module 228 and an email client resident on the subscriber device 50 which may retrieve email messages from the wireless telephone service provider's email server 28 (FIG. 1).

The web server application includes a multicast module 231 and an address translation module 31. The multicast module 231 provides IP multicast services to enable the web server application to deliver select communications to multiple subscriber stations 24 simultaneously utilizing IP multicast protocols and without using excessive bandwidth on network 22. The address translation module 31 provides address and port translation services to enable the web server to provide each subscriber station 24 with access to servers coupled to the network 18 as an IP layer proxy and without using higher layer resources of the control unit 12.

In the exemplary embodiment, non streaming media communication between the web server application 230 and each subscriber station 24 utilizes tagged data messages over a TCP/IP session between the web server application and a system client application 115 (FIG. 5) within the subscriber station 24. Each message transferred between the web server application 230 and the subscriber station 24 comprises a data element and a tag identifying the significance of the data element. For example: a) if the data element comprises the text of an email message, the tag would identify the data element as the text of an e-mail message; a) if the data element comprises an executable script that would provide for the subscriber station 24 to perform a certain function, the tag would identify the data element as executable script and may identify the significance of the script; and c) if the data element comprises display layout control information (e.g. a style sheet) defining how another data element (such as the text of the email) should be displayed on a display screen, the tag would identify the data element as a style sheet.

Streaming media communications between the web server application 230 (such as multicast streaming media messages provided by the IP multicast module 231) and the client application 115 utilize a sequence of RTP frames that include compressed media data and are sent utilizing UDP/IP channels.

To provide communication services to each subscriber, the web server application 230 processes certain scripts in response to events generated by a subscriber station 24 and the packet audio/video gateway 232. In processing the scripts, the web server application 230 manages subscriber communication data stored in a storage 235 and provides operating instructions to subscriber station client 24 and an email module 228.

The flow charts of FIGS. 10a through 10g (which will be discussed in more detail herein) represent processing scripts that in aggregate provide for a subscriber to navigate through a layered menu to select applicable services from the control unit 12. The web server application 230 maintains state information for each subscriber station 24 such that each subscriber station 24 may navigate through the layered menu independently of other subscriber station 24 units.

Subscriber Station

Figure 4:
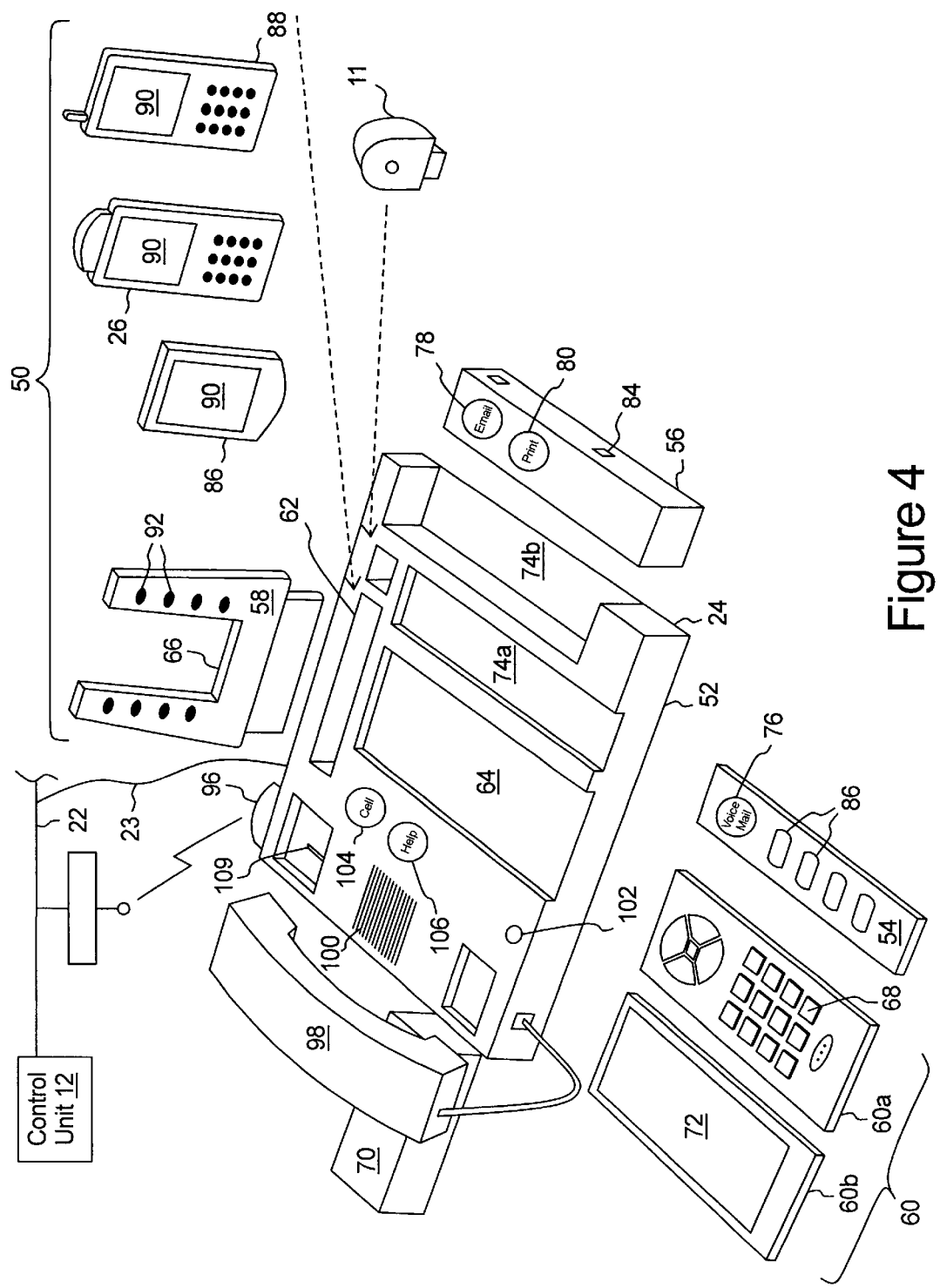
FIG. 4 is a perspective exploded view of a modular subscriber station in accordance with one embodiment of the present invention.

Referring to FIG. 4, a perspective view of an exemplary subscriber station 24 is shown. The subscriber station 24 includes a platform unit 52 that operatively couples to the control unit 12 via either a wireless communication link between a platform unit network circuit 96 and the wireless network 22 or a direct network connection 23 between the platform unit 52 and the backbone network of the wireless network 22.

A plurality of functional modules 54, 56, 58, 60, and 11 may be coupled to the platform unit 52 to form an integrated multi-media communication platform. The platform unit 52 includes a subscriber interface docking platform 64 for coupling and optionally supporting one of a plurality of modular subscriber interface units 60 to the platform unit 52. The modular subscriber interface unit 60a may include a plurality of buttons 68 in an arrangement similar to a typical telephone key pad to provide for subscriber input in a manner similar to that of a traditional telephone handset. The modular subscriber interface 60b may include a touch panel graphic display 72 to provide for subscriber input through virtual buttons visible thereon.

The platform unit 52 further includes a first function specific docking platform 74a and a second function specific docking platform 74b, each of which couples to a plurality of function specific modules 54 and 56. The first function specific docking platform 74a is a shallow platform for coupling to function specific modules that primarily comprise function specific buttons or other circuits that may be placed within a thin module. The second function specific docking platform 74b is a larger platform for coupling to function specific modules with more complex internal circuits requiring the additional size.

In the exemplary embodiment, the function specific module 54 may include subscriber interface buttons configured for enhancing voice communication through the subscriber station 24 such as a voice message control 76 for single button access to voice message files (including those received by the voice mail module 236 and those received by the voice mail server 25—both of FIG. 1) and voice management controls 86 for single button control of enhanced voice management functions.

The function specific module 56 may include circuits configured for enhancing data communication through the subscriber station 24 such as an email control 78 for single button access to subscriber email messages (including those received by email server 37 and those received by email server 28—both of FIG. 1), a print control 80 for single button initiation of the printing of an email message, and a data networking port 84.

The platform unit 52 further includes a docking bay 62 into which a modular docking interface 58 may be secured and operatively coupled to the platform unit 52. The modular docking interface 58 supports one of a plurality of modular subscriber devices 50 within a subscriber device interface bay 66 and provides for operatively coupling the modular subscriber device 50 to the platform unit 52.

While operatively coupled to the platform unit 52, the subscriber device 50 becomes an integral part of the subscriber interface of the subscriber station 24. A liquid crystal graphic display 90 on the subscriber device 50 may function to display multi-media communication management information under control of the platform unit 52 and the control unit 12. Further, programmable subscriber controls 92 positioned adjacent to the subscriber device 50 may be configured to activate platform unit 52 and control unit 12 functions in accordance with the contents of the graphic display 90 adjacent to the controls 92.

The platform unit 52 also includes docking bay 61 into which a modular video camera 11 may be coupled to the subscriber station 24. The module video camera 11 provides a video image for use by the subscriber station 24 when participating in a video conference call.

The platform unit 52 may further include one or more of the following elements: a) a handset 98 similar to a traditional telephone handset to provide a subscriber voice interface, b) a speaker 100 and a microphone 102 to provide a hands-free subscriber voice interface, c) a modular battery pack 70 (which fits within a battery pack bay that is not shown) for operating power when the subscriber station 24 is uncoupled from a line voltage, d) cell button 104 for single button selection of certain functions such as a wide area network communication function, and e) help button 106 for single button selection of a help function.

Figure 5:
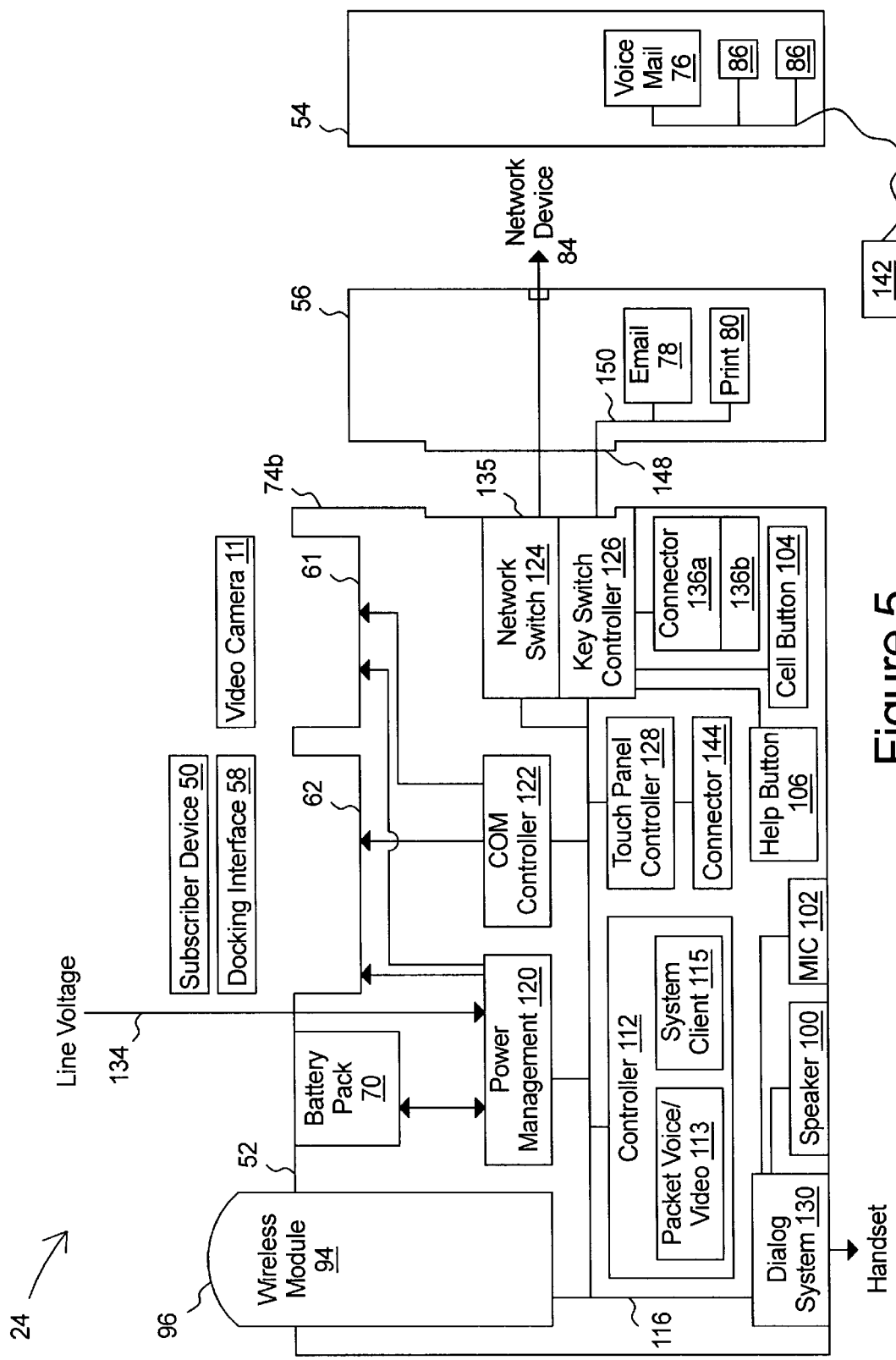
FIG. 5 is a block diagram of a subscriber station in accordance with one embodiment of the present invention.

FIG. 5 shows a block diagram of the subscriber station 24. The platform unit 52 includes an application controller 112 coupled to a local bus 116 that interconnects a controller 112 with a plurality of peripheral circuits that include a wireless module 94, a power management controller 120, a communication controller 122, a network switch controller 124, a key switch controller 126, a touch panel controller 128, and a voice communication system 130.

The wireless module 94 operatively couples the platform unit 52 with the control unit 12 over the wireless LAN 22 (both of FIG. 2). The controller 112 includes appropriate drivers for operation of the wireless module 94.

The power management controller 120 selectively receives input power from the battery pack 70 or external line voltage 134. The power management controller 120 includes appropriate circuits for converting the input power voltage to appropriate operating power required by each component of the subscriber station 24. Additionally, the power management controller 120 includes appropriate circuits for managing charging of the battery pack 70 when the platform unit 52 is coupled to the line voltage 134 and generating appropriate power for operating and/or charging the modular docking interface 58 and the modular subscriber device 50 when coupled to the platform unit 52.

The communication controller 122 operatively couples the modular docking interface 58 and the modular subscriber device 50 to the controller 112 such that the platform 52 can exchange data with the modular subscriber device 50. In the exemplary embodiment the communication controller is a serial communication controller that enables the serial exchange of data with a compatible serial communication controller within the modular subscriber device 50 over a physical medium. Exemplary physical mediums include hardwired contacts, an infrared transmission, and RF transmission, however other physical mediums are envisioned and the selection of a physical medium is not critical to this invention.

The communication control 122 also operatively couples the modular video camera 11 to the controller 112 such that the platform unit 52 may power the video camera 11 and receive the video image from the video camera 11.

The network switch controller 124 provides a network data port 84 which enables the controller 112 to communicate with another network computing circuit over a network interface. The network switch controller 124 is coupled to a bus port 135 within the function specific docking platform 74b for coupling to a mating port 148 on the function specific module 56.

The key switch (e.g. button) controller 126 is coupled to: 1) a connector 136a which in turn is coupled to a mating connector on the modular subscriber interface unit 60a (FIG. 4) for interconnecting the buttons 68 to the key switch controller 126; 2) a connector 136b which in turn is coupled to a mating connector 142 on the function specific module 54 for interconnecting the buttons 76 and 86 to the key switch controller 126; 3) the bus port 134 which in turn is coupled to a mating port 148 on the function specific module 56 for interconnecting the buttons 78 and 80 to the key switch controller 126; 4) the cell button 104; 5) and the help button 106. In the exemplary embodiment, the key switch controller 126 may drive row and column signals to the various buttons and, upon detecting a short between a row and a column (e.g. button activation) reports the button activation to the application controller 112 over the bus 116. Again, the application controller 112 includes appropriate drivers for operating the key switch controller 126.

The touch panel controller 128 is coupled to a connector 144 which in turn is coupled to a mating connector on the modular subscriber interface unit 60b (FIG. 4) for interconnecting the touch panel graphic display 72 to the touch panel controller 128. In the exemplary embodiment, the touch panel controller 128 may include a separate display control circuit compatible with the resolution and color depth of the touch panel graphic display 72 and a separate touch panel control circuit for detecting subscriber contact with the touch panel graphic display 72. The application controller 112 includes appropriate systems for driving the contents of the touch panel graphic display 72 through the touch panel controller 128.

The voice communication system 130 generates analog voice signals for driving the speaker 100 (or the speaker in the handset 98 of FIG. 4) and detects input from the microphone 102 (or the microphone in the handset 98) under the control the application controller 112.

In the exemplary embodiment, the controller 112 executes a packet audio/video communication client 113 and a client application 115. The packet audio/video communication client 113 provides for setting up UDP/IP channels for RTP packet voice and RTP packet video communications with the packet audio/video gateway 232 (FIG. 3) within the control unit 12. And, during the course of a audio or audio/video session, the packet audio/video communication client 113 compresses video images from the video camera into a sequence of RTP frames for sending to the gateway 232, compresses voice signals from the voice communication circuit 130 into sequences of RTP frames for sending to the gateway 232 and decompresses RTP frames of video images and audio signals received from the gateway 232 for driving the voice communication circuit 130 and for displaying a video image on a display. In the exemplary embodiment, the packet audio/video communication client 113 may be one of the commercially available clients utilizing established protocols such as the International Telephone Union (ITU) H.323 protocols, The Internet Engineering Task Force (IETF) Session Initiation Protocols, or other protocols useful for signaling and establishing a real time streaming media session with the packet audio/video gateway 232.

The client application 115 operates as a client to the web server application 230 (FIG. 4) within the control unit 12. The client application 115 provides for the controller 112 to: a) generate an image on the touch panel graphic display 72 or on the graphic display 90 on the subscriber device 50 in accordance with display content and a style sheet received from the control unit 12; b) output an audio stream file received from the control unit 12 through the dialog system 130; c) execute processing steps in accordance with instructions received from the control unit 12; d) provide messages indicating subscriber actions (such as subscriber activation of the cell button 104, the help button 106, a touch panel virtual button, or any other button on the subscriber station 24) to the web server application 230; e) activate the packet audio/video client 113 to set up a real time audio/video session with the packet audio/video gateway 232 (FIG. 3); f) identifying the modular configuration or subscriber interface configuration of the subscriber station 24 and reporting the configuration to the control unit 12; and g) reporting the coupling of (and decoupling of) a subscriber device 50 and/or modules to the platform 52 of the subscriber station 24 to the control unit 12. A more detailed discussion of the client application 115 is included herein.

Subscriber Data Assistant

Figure 6:
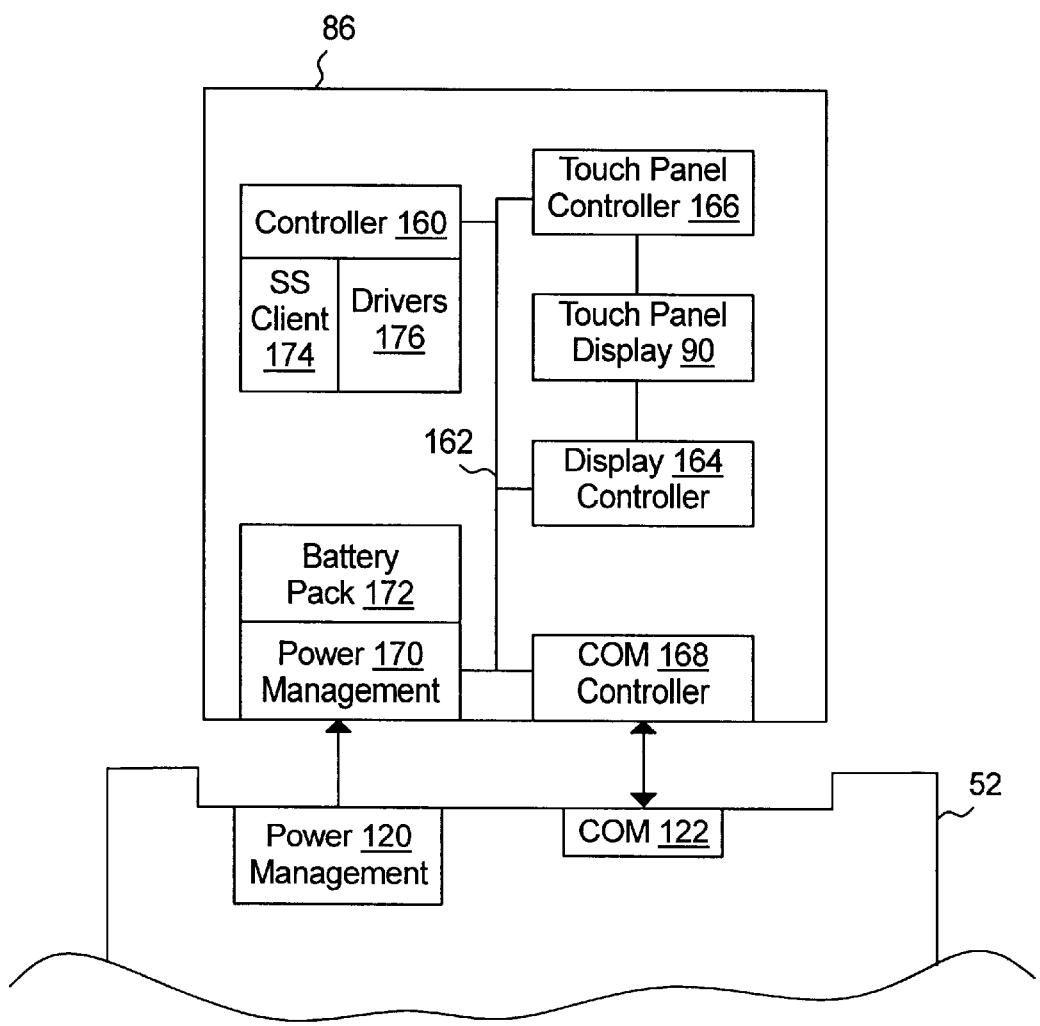
FIG. 6 is a block diagram of a subscriber data assistant in accordance with one embodiment of the present invention.

Turning to FIG. 6, exemplary structure of a subscriber data assistant 86 is shown. The subscriber data assistant 86 includes a controller 160 interconnected to a plurality of peripheral controllers by an internal bus 162. Because of the small size and the portability of the subscriber data assistant 86, the touch panel 90 provides the primary subscriber interface. The touch panel 90 is controlled by a display controller 164 and a touch panel controller 166. The display controller 164 drives the liquid crystal display of touch panel 90 using signals compatible with the resolution and color depth of the display 90. The touch panel controller 166 detects user activation of the touch panel 90. The controller 160 operates appropriate drivers 176 for controlling operation of the touch panel controller 166 and the display controller 164.

A communication controller 168 is also coupled to the bus 162 and operates under control of the application controller 160. In the exemplary embodiment, the communication controller 168 is a serial communication controller that is compatible with the communication controller 122 of the platform unit 52 (both of FIG. 5) such that data communication may occur between the platform unit 52 and the subscriber data assistant 86 when the subscriber data assistant 86 is operatively coupled to the platform unit 52.

A power management circuit 170 selectively receives input power from a battery pack 172 or from the power management circuit 120 in the platform unit 52. The power management circuit 170 includes appropriate circuits for converting the input power voltage to appropriate operating power required by each component of the subscriber data assistant 86. Additionally, the power management circuit 170 includes appropriate circuits for managing charging of the battery pack 172 when the subscriber data assistant is coupled to the platform unit 52.

The controller 160 also operates a subscriber station client application 174 for displaying multi-media communication management information under control the platform unit 52 when coupled to the platform unit 52. In the exemplary embodiment the subscriber station client application 174 receives messages from the platform unit 52 in the form of tagged messages. After receipt of the tagged messages, the subscriber station client application 174 builds a display document to display the communication management information represented by tagged content messages in accordance with a style sheet that is compatible with the size, resolution, and color depth of the touch panel display 90. The display document is then displayed on the touch panel display 90.

It should be appreciated that in addition to operating the drivers 176 and the subscriber station client application 174, the controller 160 may optionally operate any of the software applications that are commercially available for portable data assistants (PDAs) which may include address book management software, calendar management software, and games. While operation of such PDA applications may be useful to the subscriber, it is not critical to the operation of the present invention.

Subscriber Wide Area Network Communication Device

Figure 7:
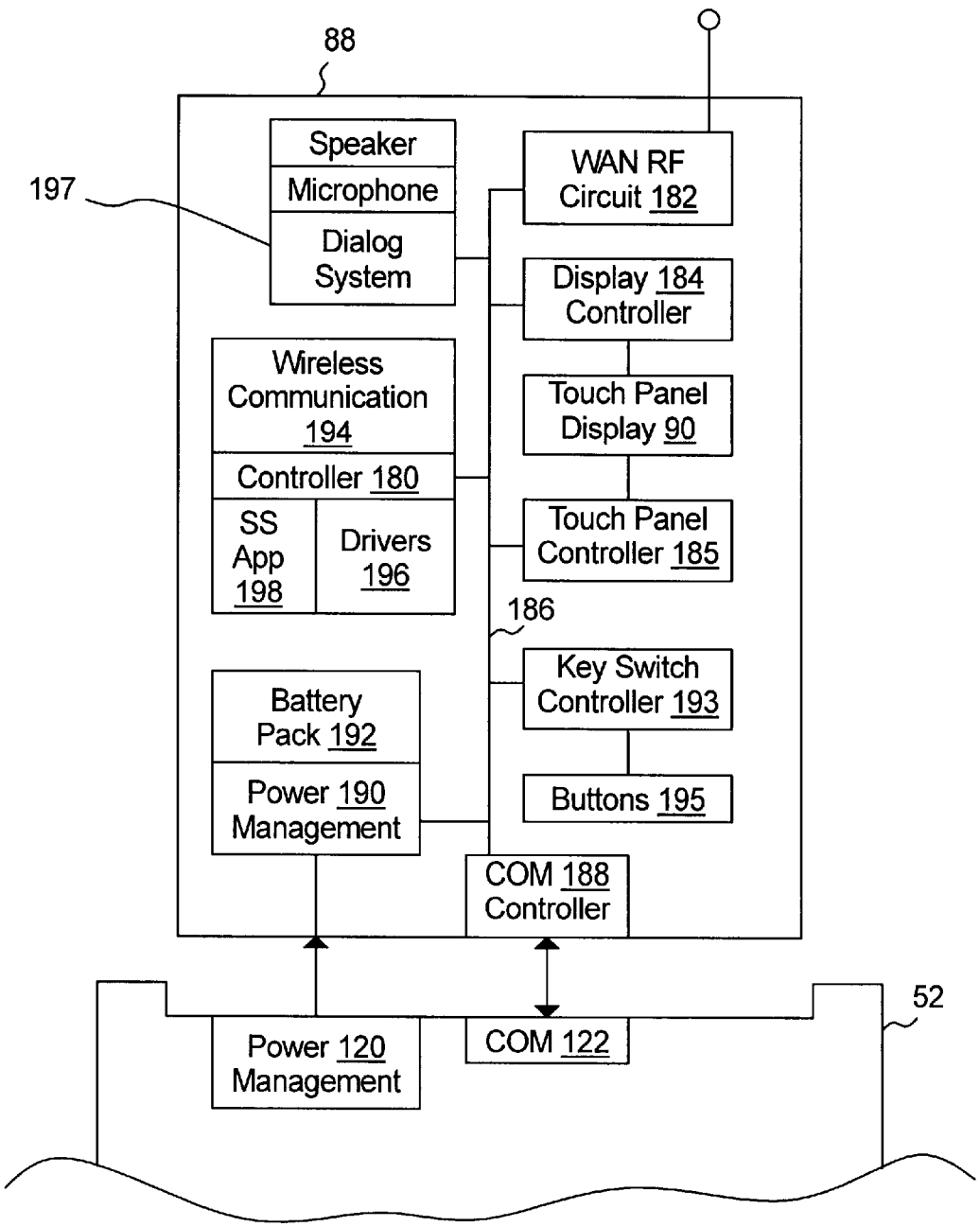
FIG. 7 is a block diagram of a wide area network communication device in accordance with one embodiment of the present invention.

Turning to FIG. 7, exemplary structure of a subscriber wide area network communication device 88 is shown. The wide area network communication device 88 includes a controller 180 operating a subscriber station application 198, a wireless communication application 194, and applicable drivers 196 for a plurality of peripheral controllers. The controller 180 is interconnected to the plurality of peripheral controllers by an internal bus 186. The peripheral controllers include a wide area network RF circuit 182, a voice system 197, a display controller 184, a touch panel controller 185, a key switch controller 193, a communication controller 188, and a power management system 190.

The wide area network RF circuit 182 may be a circuit for transmitting and receiving signals from a wide area network service provider's medium under control of the wireless communication application 194. Exemplary wide area network service provider mediums include an analog or digital cellular or PCS telephone RF system.

The key switch controller 193 is coupled to the control buttons 195. The key switch controller 193 drives row and column signals to the control buttons 195 and, upon detecting a short between a row and a column indicating button activation, reports the activation to the controller 180. The control buttons may be used by a subscriber for operating the wide area network communication device 88 when uncoupled form the platform unit 52.

The voice system 197 includes a speaker and a microphone. Under control of the wireless communication application 194, the voice system 197 may provide a subscriber voice interface for an audio session with a remote device over the wide area network service provider's medium.

The display controller 184 drives the display 90 using signals compatible with the resolution and color depth of the display 90. The display 90 may optionally be a touch panel display 90 and the touch panel controller 185 detects user activation of the touch panel 90.

The communication controller 188 may be a serial communication controller compatible with the communication controller 122 in the platform unit 52 such that data communication may occur between the platform unit 52 and the wide area network communication device 88 when the wide area network communication device is operatively coupled to the platform unit 52.

The power management controller 190 operating with a battery pack 192, both of which may operate in a similar manner to the power management controller 170, and the battery pack 172 discussed with reference to FIG. 6.

Similar to the subscriber data assistant 86 (FIG. 6), when the wide area network communication device 88 is coupled to the platform unit 52, the Subscriber station application 198 provides for displaying multi-media communication management information under control the platform unit 52 and provides for multimedia communication directly between the platform unit and the wide area network service provider medium.

In addition the Subscriber station application 198 may receive messages from the platform unit 52 which may be multi-media communication messages for communication over the wide area network service provider medium. Each message includes a tag that identifies the contents of the message. After receipt of a tagged message, the subscriber station application 198 may identify whether the message is for communication with the wide area network service provider medium or whether it is multi-media communication management information for display.

When the message is for communication with the wide area network service provider medium, the subscriber station application 198 will reformat the message to a format compatible with wide area network service provider medium transmission standards and transmit the message using the wide area network RF circuit 182.

The wide area network communication device 88 may also receive signals from the wide area network service provider medium via the wide area network RF circuit 182. When received, the subscriber station application 198 reformats the messages into a plurality of tagged messages for communication to the platform unit 52 and sends the tagged messages to the platform unit 52 via the communication controller 188.

Wireless Voice Handsets

Figure 8:
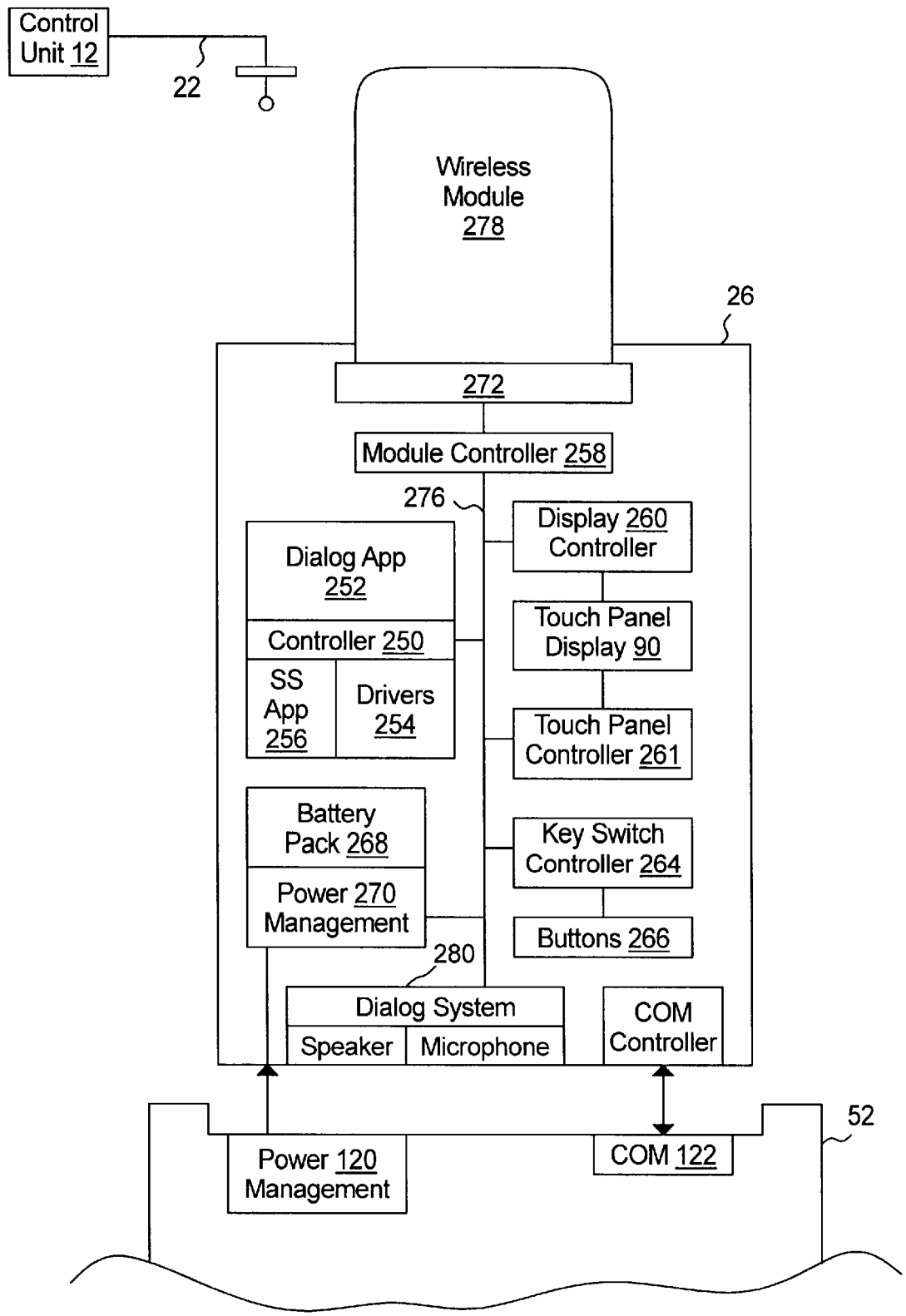
FIG. 8 is a block diagram of a wireless dialog handset in accordance with one embodiment of the present invention.

FIG. 8 shows a block diagram of an exemplary wireless dialog handset 26. The wireless voice handset 26 includes a network circuit 278 and a controller 250 that operates a subscriber station application 256', a LAN communication application 252, and applicable drivers 254 for each of a plurality of peripheral controllers. The controller 250 is interconnected by a bus 276 to the plurality of peripheral controllers which include a module controller 258, a display driver 260, a touch panel driver 261, a key switch controller 264, and a power management circuit 270.

The module controller 258 operatively couples the network circuit 278 to the controller 250 such that the wireless voice handset 26 may communicate with the control unit 12 over the wireless LAN 22 (both of FIG. 2). In the exemplary embodiment, the module controller 258 may be a PCMCIA controller circuit and the network circuit 278 is configured as a PCMCIA card that coupled to the module controller 258 through a PCMCIA connector 272. The LAN communication application 252 operates the network circuit 278 for communicating with the control unit 12 using appropriate wireless signaling protocols.

The key switch controller 264 is coupled to the control buttons 266. The key switch controller 264 drives row and column signals to the control buttons 266 and, upon detecting a short between a row and a column indicating button activation, reports the activation to the controller 250. The control buttons may be used by a subscriber for operating the wireless voice handset 26 when uncoupled form the platform unit 52.

The display controller 260 drives the display 90 (optionally a touch panel display 90) using signals compatible with the resolution and color depth of the display 90. The touch panel controller 261 detects user activation of the touch panel display 90. The power management controller 270 operates in conjunction with a battery pack 268, both of which may operate in a similar manner to the power management controller 170, and the battery pack 172 discussed with reference to FIG. 6.

When the wireless voice handset 26 is coupled to the platform unit 52, the subscriber station application 256 provides for displaying multi-media communication management information under control the platform unit 52. Additionally, the subscriber station application 256 may receive multi-media communication management information content messages and control messages directly from the control unit 12 via the wireless network 22. After receipt of the tagged messages from either the platform unit 52 or the control unit 12, the subscriber station application 256 builds a document to display the communication management information represented by the tagged content messages in accordance with display layout control messages that are compatible with the size, resolution, and color depth of the touch panel display 90. The display document is then displayed on the touch panel display 90.

Web Server Application

Referring to FIGS. 10a through 10j in conjunction with FIG. 3, exemplary processing steps performed by the web server application 230 to provide communication services to a subscriber station 24 are shown.

Figure 10B:
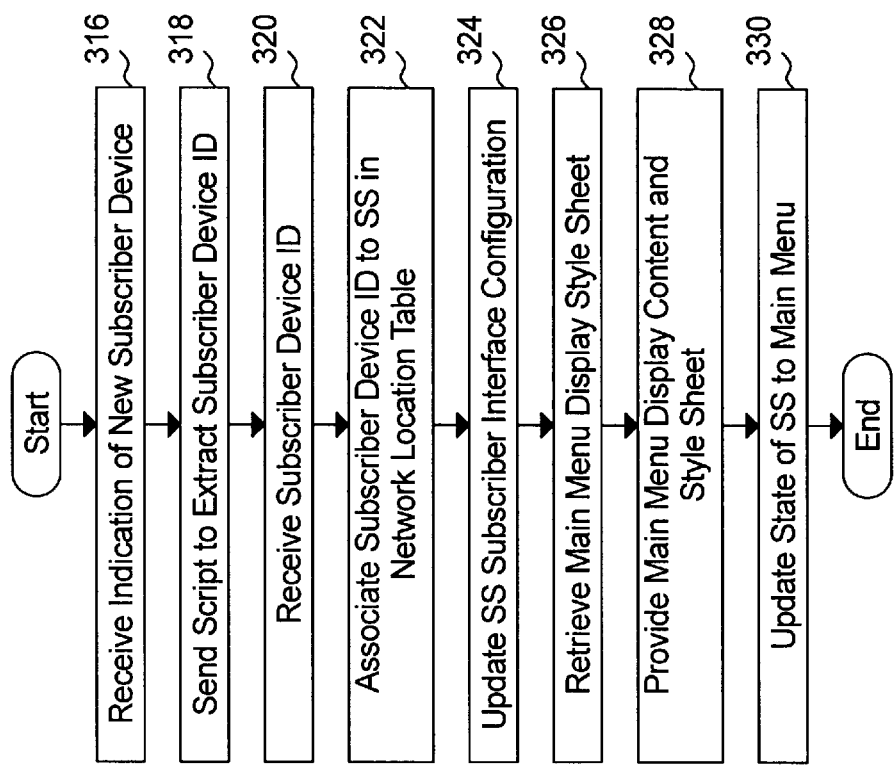
FIGS. 10a through 10j each show a flow chart representing processing steps performed by a multi-media communication management system in accordance with one embodiment of the present invention.
Figure 10A:
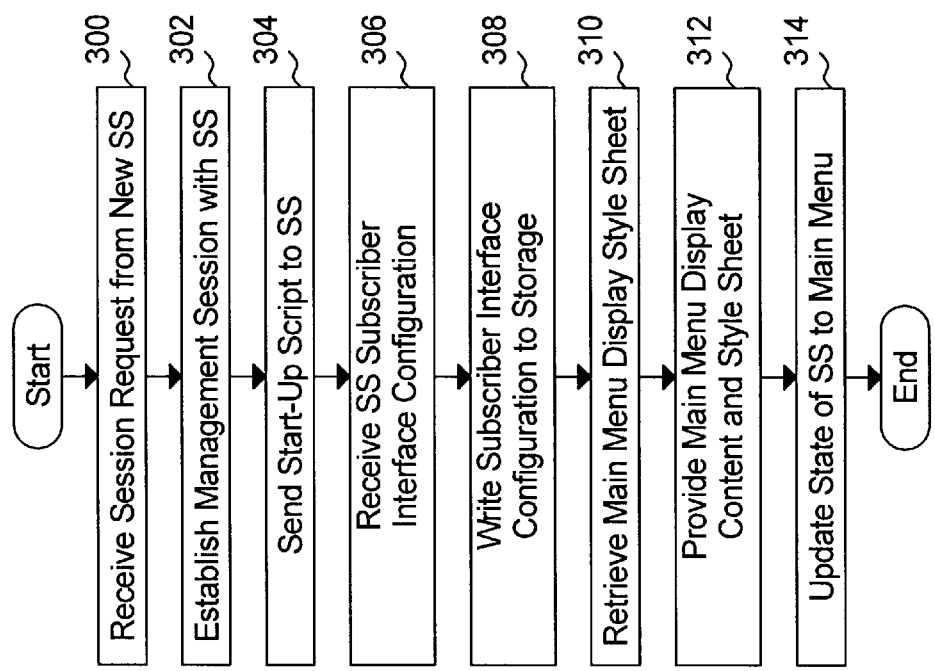

The flowchart of FIG. 10a represents steps performed by the web server application 230 upon receiving an open session request on a predetermined port from a subscriber station 24 that has just been operatively coupled to the network 22, obtained a network address from the network address server 220, and is ready to operate as a client to the web server application 230. Step 300 represents receipt of the open session request and step 302 represents establishing a TCP/IP session with the subscriber station 24.

Step 304 represents sending a start up script to the subscriber station 24. The start up script includes instructions that, when executed by the client application 115, provide for the subscriber station 24 to detect its subscriber interface configuration (e.g. whether the subscriber station 24 includes a display screen and what capabilities such as video capabilities and graphic resolution capabilities the display screen may have) and to report its subscriber interface configuration back to the web server application 230.

Step 306 represents receipt of the subscriber interface configuration of the subscriber station 24 from the subscriber station 24 and step 308 represents writing an indication of the subscriber interface configuration of the subscriber station 24 to a subscriber interface table 239 in the storage 235.

Step 310 represents retrieving a main menu display style sheet from a selection of style sheets 241 stored in the storage 235. The retrieved main menu display style sheet will be a style sheet that corresponds to the subscriber interface configuration of the subscriber station 24.

Step 312 represents providing main menu display content and the style sheet to the subscriber station 24 and step 314 represents updating a subscriber station state table 243 in the storage 235 to indicate that the subscriber station 24 is in a main menu state.

Figure 11B:
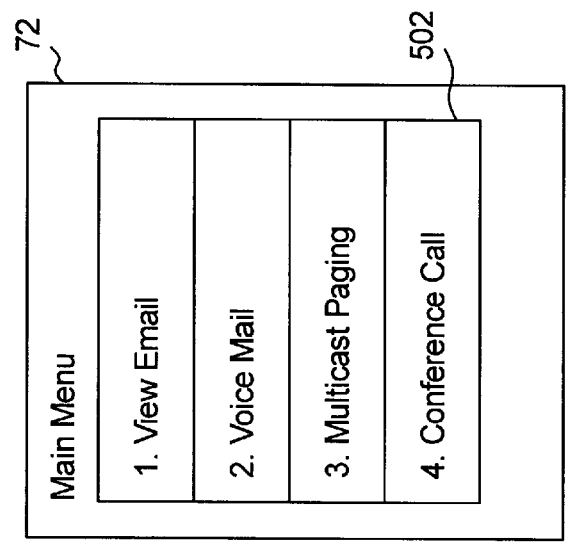
FIGS. 11a through 11h each show an exemplary display of information to a subscriber utilizing a subscriber interface of a subscriber station in accordance with one embodiment of the present invention.
Figure 11A:
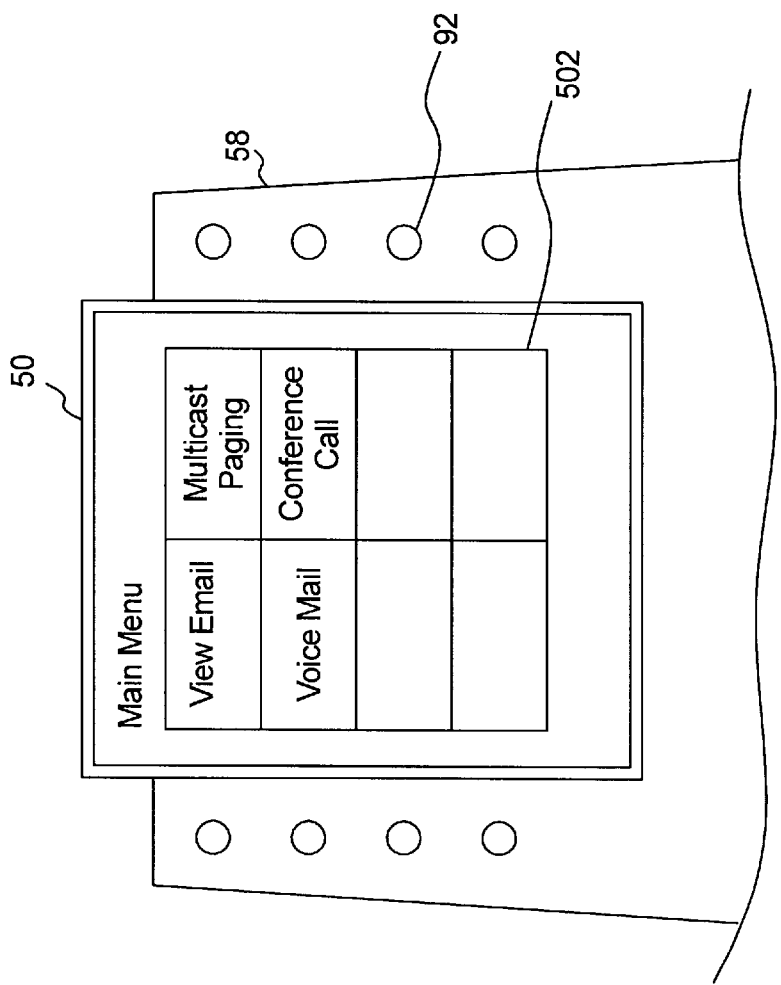

It should be appreciated that the main menu content provided to the subscriber station 24 is independent of the subscriber interface, however, the style sheet provided to the subscriber station 24 is dependent on the subscriber interface. For example, turning to FIG. 11a which represents display of a main menu on a subscriber device 50 in the modular docking interface 58 the content of the main menu display includes a title of main menu and choices of view email, voice mail, and multi cast paging. The style sheet corresponding to a subscriber interface that includes a subscriber device 50 provides for the content to be graphically displayed with the title at the top and each menu choice to be displayed adjacent a button 92 on the modular docking interface 58. Alternatively, turning to FIG. 11b which represents display of a main menu on a display 72 that is coupled to a subscriber station interface 64 (FIG. 4), the content of the main menu display again includes a title of main menu and the choices of view email, voice mail, and multi cast paging. However, the style sheet that corresponds to a subscriber interface that includes a display 72 that is coupled to a subscriber station interface 64 provides for the content to be graphically displayed with the title at the top and each choice to be displayed in a vertical list with an adjacent numeral for selection using the keypad 68 (FIG. 4). The examples shown in FIGS. 11a and 11b are for illustrative purposes only. Other subscriber interface configurations that include non-graphic displays, bit mapped multi line text displays, or 7 element single or multi line text displays may utilized different style sheets for displaying all or a portion of the main menu content.

The flowchart of FIG. 10b represents steps performed by the web server application 230 upon receiving an indication that a subscriber device 50 has been coupled to a subscriber station 24. Step 316 represents receipt of such indication.

Step 318 represents sending a device ID extraction script to the subscriber station 24. The device ID extraction script includes instructions that, when executed by the client application 115, provide for the subscriber station 24 to interrogate the subscriber device 50 to determine its device identification (e.g. an identification of which subscriber to which the device has been assigned) and to report the device identification back to the web server application 230.

Step 320 represent receipt of the device identification back from the subscriber station 24 and step 322 represents associating the device ID with the subscriber station 24 in the network location table 245 in the storage 235. As discussed previously, the packet audio/video gateway 232 utilizes the network location table 245 for routing incoming telephone calls to the particular subscriber station 24 at which a subscriber's subscriber device 50 is then currently coupled. It should be appreciated that this step 322 provides for the network location table 245 to properly indicate association between a subscriber station 24 and the subscriber device 50 that is served thereby.

Because the style sheet selected for display of content on the subscriber station 24 is dependent on the subscriber interface configuration of the subscriber station 24 as determined by the subscriber interface table 239, the table should be updated when the subscriber interface configuration changes. Coupling a subscriber device 50 to a subscriber station 24 changes the subscriber interface because the display of the subscriber device 50 becomes a display for the subscriber station 24. As such, step 324 represents updating the subscriber interface configuration of the subscriber station 24 in the subscriber interface table 239.

Step 326 represents retrieving a main menu display style sheet that is applicable to the new subscriber interface configuration from the selection of style sheets 241 in the storage 235 and step 328 represents providing main menu display content and the style sheet to the subscriber station 24. Step 330 represents updating the subscriber station state table 243 to assure that it represents that the subscriber station 24 is in the main menu state.

Figure 10D:
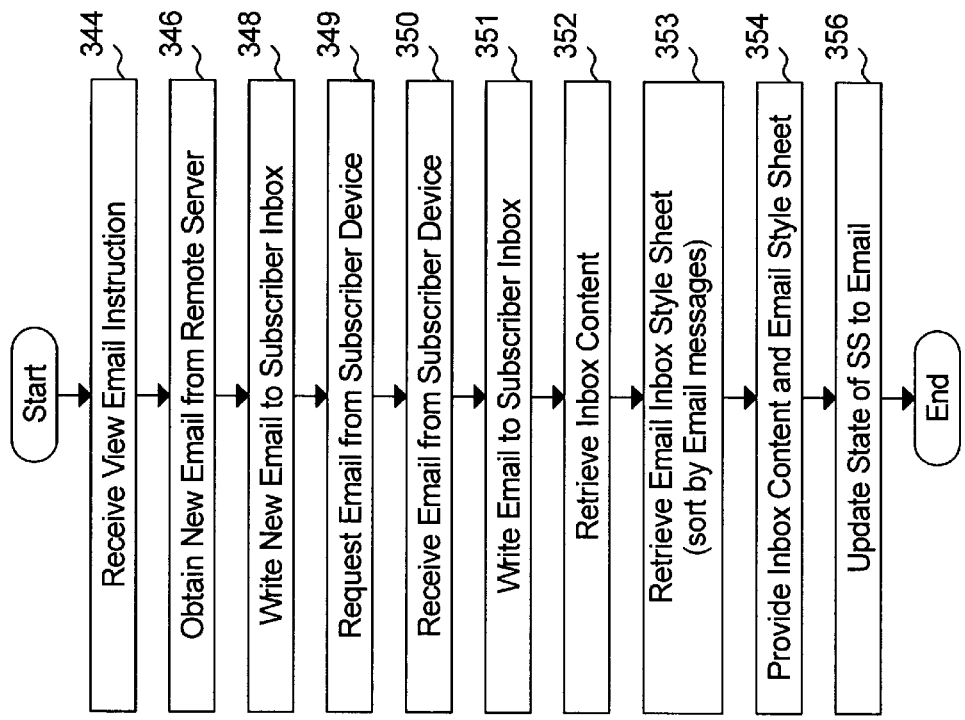
Figure 10C:
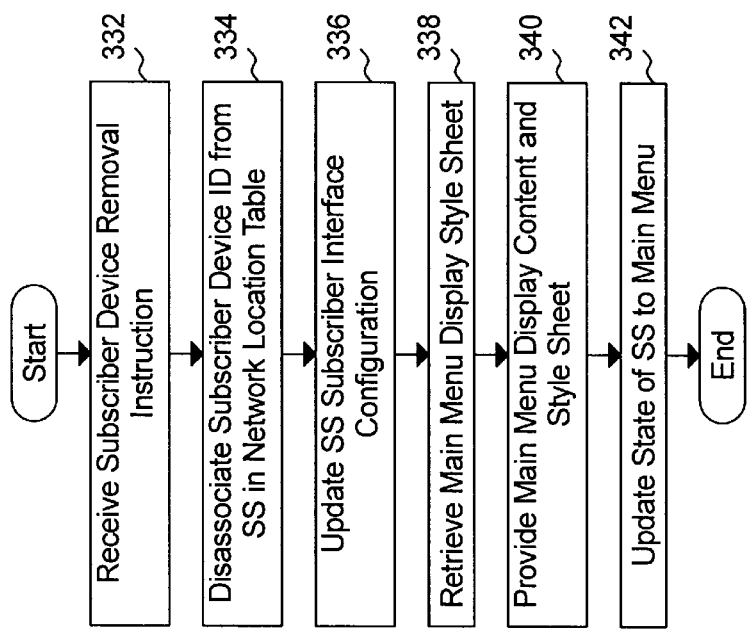

The flow chart of FIG. 10c represents steps performed by the web server application 230 upon receiving an indication that a subscriber device 50 has been removed from a subscriber station 24. Step 322 represents receipt of such an indication.

Because the packet audio/video gateway 232 utilizes the network location table 245 for routing incoming telephone calls to the particular subscriber station 24 at which a subscriber's subscriber device 50 is then currently coupled. The network location table should be updated upon removal of a subscriber device from a subscriber station 24. Step 334 represents disassociating the subscriber device 50 from the subscriber station 24 in the network location table 245.

Because the display on the subscriber device 50 is no longer part of the subscriber interface of the subscriber station 24 after the subscriber device 50 is removed, step 336 represents updating the subscriber interface configuration table 239.

Step 338 represents retrieving a main menu display style sheet that is applicable to the subscriber interface configuration without the subscriber device 50 from the selection of style sheets 241 in the storage 235 and step 340 represents providing main menu display content and the style sheet to the subscriber station 24. Step 342 represents updating the subscriber station state table 243 to assure that it represents that the subscriber station 24 is in the main menu state.

The flowchart of FIG. 10d represents steps performed by the web server application 230 upon receiving a subscriber indication of a command to view subscriber email messages. The means by which the subscriber station 24 may detect such a subscriber indication is dependent on the subscriber interface configuration of the subscriber station 24. For example, if the subscriber interface includes the email button 78 (FIG. 4), detection of button 78 activation would be a subscriber indication of a command to view subscriber email messages. Similarly, subscriber activation of the email menu choice on the main menu either by touch panel activation or by activation of a button associated with the menu choice (either or both of which may be applicable dependent on the subscriber interface configuration) would be a subscriber indication of a command to view subscriber email messages. Step 344 represents the web server application 230 receiving the subscriber indication of a command view subscriber email messages.

Step 346 represents instructing the email module 228 to logon onto an email server (which may be the remote email server 37 associated with and/or coupled to the network 18) and to receive new email messages associated with the subscriber's account. Step 348 represents writing the new email messages to the subscriber inbox in the email files 247 in the storage 235. In an embodiment wherein the remote email server maintains subscriber inbox information, steps 346 and 348 may be viewed as synchronizing the email messages between the remote server and the email files 247. It should also be appreciated that the email module 228 may periodically retrieve new email messages and write to the subscriber inbox independently of whether the subscriber has activated an email control. As such, the inbox will already include new messages and steps 346 and 348 may not need to be performed in response to event 344.

Step 349 represents providing instructions to the space station 24 to obtain email messages from the subscriber device 50 by communicating with the subscriber station application 198 (or 174, 256) of the subscriber device 50 through the communication controller 122. Such email messages may include email messages that the subscriber device 50 retrieved from the email server 28 (including emails with compressed audio files representing voice mail messages obtained by the voice mail server 25).

Step 350 represents receiving such emails from the subscriber device 24. Step 351 represents writing such emails to the subscriber inbox. It should be appreciated if a subscriber device 50 is sequentially docked and undocked for a subscriber station 24 multiple times, it would be possible to create duplicate emails in the subscriber inbox. Various synchronization techniques may be used to avoid writing duplicate messages to the subscriber inbox.

Step 352 represents retrieving inbox content from the email files 247 and step 354 represents retrieving an inbox style sheet that is applicable to the subscriber interface from the style sheets 241 in the storage 235. Because the subscriber's voice mails will be sent to the subscriber's email account as audio files, it is possible that he email messages retrieved at step 346 will include both text based emails and emails from the voice mail server 226. Because the subscriber activated a command to view email messages the inbox style sheet provides for the display of the email messages received from senders other than the voice mail server 226 to be displayed first (or on the top of the display).

Additionally, because the inbox content includes both emails from the email server 37 and the email server 28, the content may further include an indication of from which server the email was retrieved. The style sheet may provide for display of such indication in association with each mail message represented on the display.

Step 354 represents providing the inbox content and style sheet to the subscriber station 24 and step 356 represents updating the subscriber station state table 243 to indicate that the subscriber station 24 is in an email state.

Figure 10F:
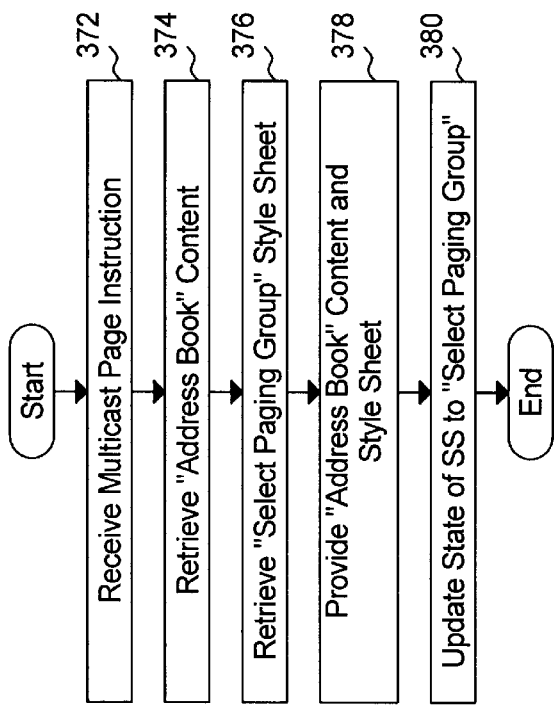
Figure 10E:
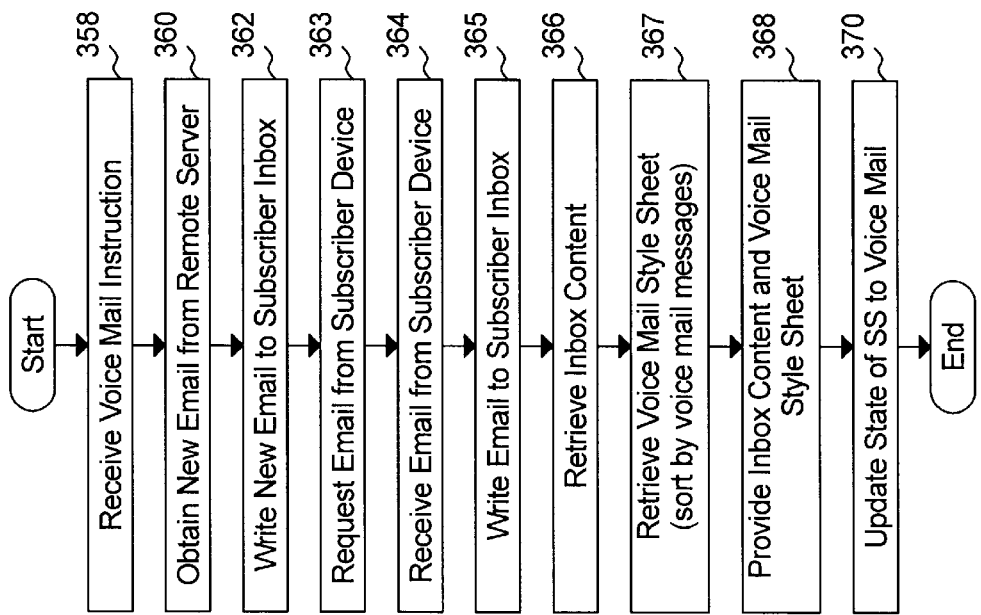

The flowchart of FIG. 10e represents steps performed by the web server application 230 receiving a subscriber indication of a command to obtain voice mail messages. Again, the means by which the subscriber station 24 may detect such a subscriber indication is dependent on the subscriber interface configuration of the subscriber station 24. For example, if the subscriber interface includes the voice mail button 76 (FIG. 4), detection of button 76 activation would be a subscriber indication of a command to obtain voice mail messages. Similarly, subscriber activation of the voice mail menu choice either by touch panel activation or by activation of a button associated with the menu choice would be a subscriber indication of a command to obtain voice mail messages. Step 358 represents the web server application 230 receiving the subscriber indication of a command obtain voice mail messages.

Because voice mail messages will be sent as audio files form the voice mail server 226 to the subscriber's email account, step 360 represents instructing the email module 228 to logon onto the email server and to receive new email messages associated with the subscribers account. Step 362 represents writing the new email messages to the subscriber inbox in the email files 247 in the storage 235.

Step 363 represents providing instructions to the space station 24 to obtain email messages from the subscriber device 50 by communicating with the subscriber station application 198 of the subscriber device 50 through the communication controller 122. Such email messages may include email messages that the subscriber device 50 retrieved from the email server 28 (including emails with compressed audio files representing voice mail messages obtained by the voice mail server 25).

Step 366 represents retrieving inbox content from the email files 247 and step 367 represents retrieving an voice mail style sheet that is applicable to the subscriber interface from the style sheets 241 in the storage 235. Because the email messages that include voice mail audio files from the voice mail server 226 may be intermixed with email messages from other senders, the voice mail style sheet provides for only the display of the voice mail messages received from the voice mail server 226. Additionally, because the inbox content includes both voicemails from the voice mail module 236 and from the voice mail server 25, the content may further include an indication of from which server the voicemail was retrieved. The style sheet may provide for display of such indication in association with each message represented on the display.

Step 368 represents providing the inbox content and the voice mail style sheet to the subscriber station 24 and step 370 represents updating the subscriber station state table 243 to indicate that the subscriber station 24 is in a voice mail state.

The flowchart of FIG. 10f represents steps performed by the web server application 230 upon receiving a subscriber indication of a command to initiate a multicast paging message. The subscriber station 24 may detect such a subscriber indication by various means, such as touch panel activation of button activation of a menu selection on the main menu, dependent on the subscriber interface configuration of the subscriber station 24. Step 372 represents the web server application 230 receiving the subscriber indication of a command to initiate a multicast paging message.

Step 374 represents retrieving the subscriber's address book content 249 from the email files 247. Turning briefly to FIG. 9b, the address book content 249 may comprise a plurality of records with each record including a group identification name and identification of each subscriber in such group, and, if the group identifies a single person, contact information for the person.

Step 376 represents retrieving a select paging group style sheet that corresponds to the subscriber interface of the subscriber station 24 and step 378 represents providing both the address book content and the select paging group style sheet to the subscriber station 24. Step 380 represents updating the subscriber station state table 243 to indicated that the subscriber station 24 is in the select paging group state.

Figure 11D:
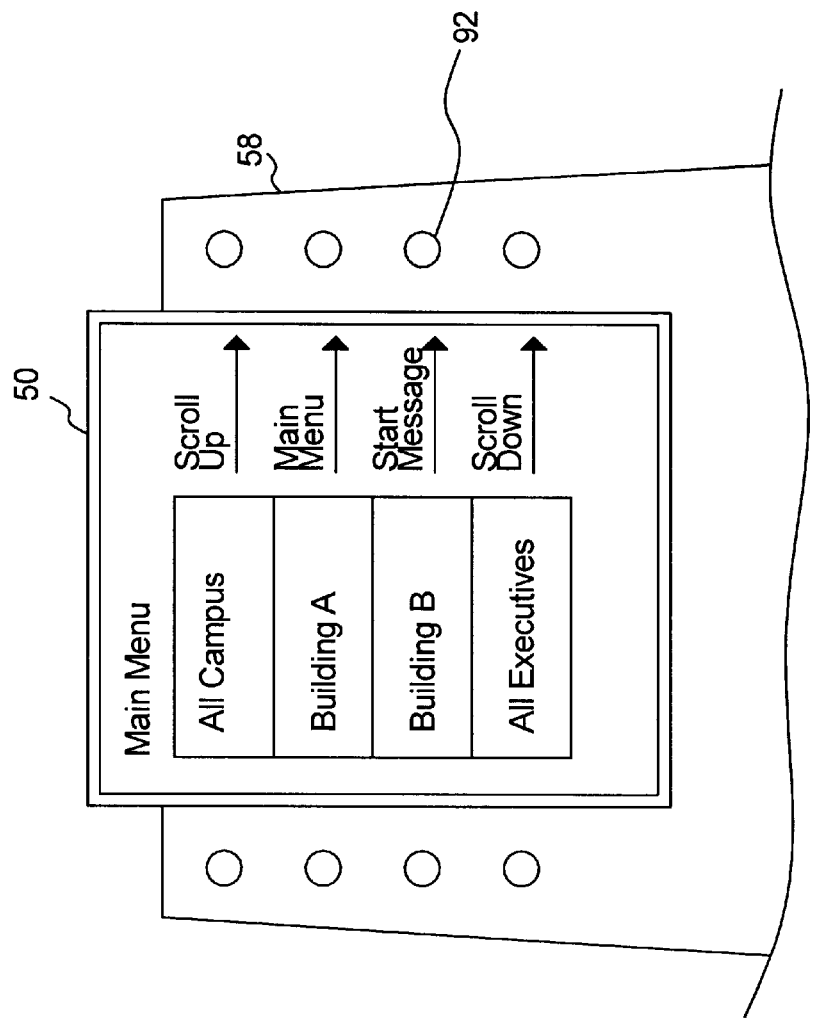
Figure 11C:
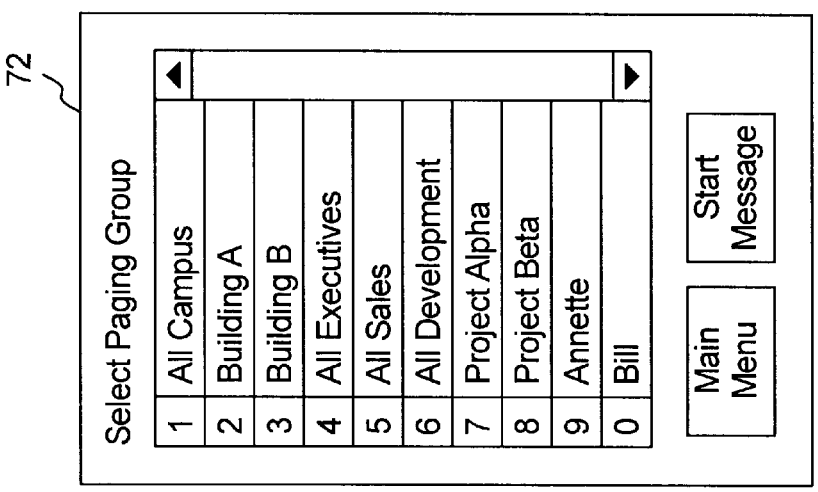

FIG. 11c represents an exemplary display of the select paging group content utilizing a style sheet that may be applicable for use on a display 72 wherein the subscriber may use buttons or touch panel activation may be utilized to select one or more paging groups to include in the multicast page. It should be appreciated that some paging groups may include only a single name such that individuals may be selected to include in the multicast page. Because the list of groups included in the paging group content may be larger than can be displayed on the display 72, the style sheet may provide for only a portion of the content to be displayed along with touch activated scroll controls for display of the remainder of the content. The style sheet may further include touch activated controls to return to the main menu and to start the multicast message.

FIG. 11*d* represents an exemplary display of the select paging group content utilizing a style sheet that may be applicable for display of the content on a display of a subscriber device 50 coupled in the modular docking interface 58. Because subscriber selection is to be by activation of buttons 92, the style sheet provides for the content to be displayed with the groups on the left side for selection by buttons 92 on the left side of the modular docking interface 58 and for indicators to label the function of the buttons 92 on the right side of the modular docking interface 58 such as scroll up, scroll down, start message, and return to main menu.

Figure 10G:
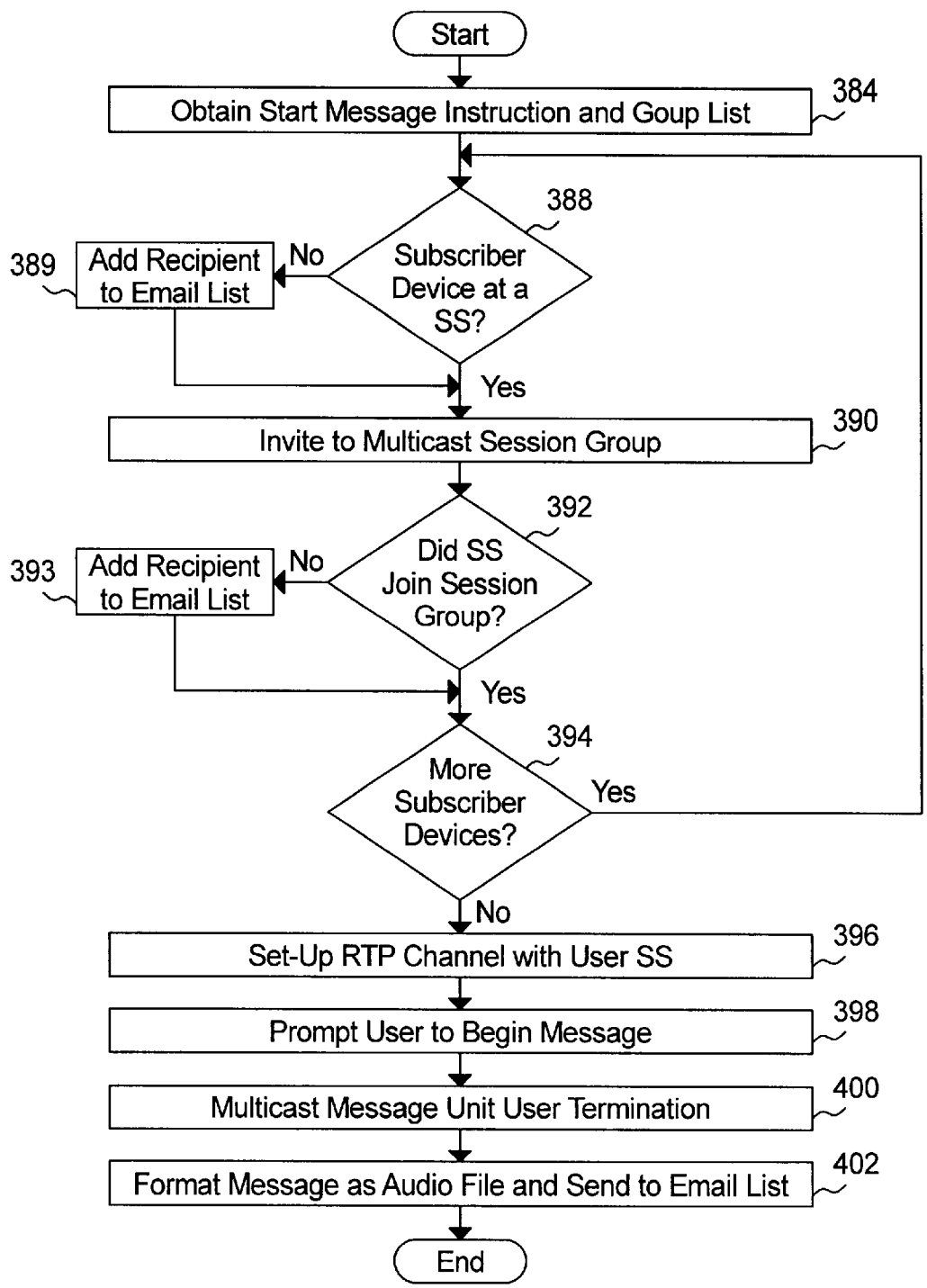

The flowchart of FIG. 10*g* represents steps performed by the web server application 230 upon receiving a subscriber indication of a command to start the multicast paging message. Step 384 represents receipt of such a subscriber indication along with identification of the subscriber selected multicast groups to include in a multicast recipient list.

Steps 388 through 394 represents steps that are performed by the web server application 230 for each recipient. Such steps may be performed in sequence or in parallel. For purposes of illustration, the steps are shown performed in sequence. Step 388 represents identifying the subscriber device 50 that is associated with the recipient and determining if the subscriber device is then currently coupled to a subscriber station 24. If yes, step 390 represents inviting such subscriber station 24 to the multicast session group. However, if the subscriber device 50 associated with the recipient is not coupled to a subscriber station 24 where the subscriber may receive the multicast, then at step 404 the recipient is added to an email list.

Following step 390, step 392 represents determining whether the subscriber station 24 joined the multicast session group. If the subscriber station 24 is operating a voice session, it would be inappropriate to interrupt the voice session with a multicast page for the subscriber. As such, it is envisioned that the subscriber station 24 may, when in certain operational states, not join the multicast session group. In which case, the recipient is added to the email list at step 406. At this time, the voice mail module is invited to the multicast session group to receive the multicast on behalf of each recipient added to the email list at step 404 or 406.

After the recipient is either added to the email list at step 405 or the subscriber station 24 joined the multicast session group at step 392, step 394 represents determining if steps 388 though 392 must be performed for additional recipients. If not, step 396 represents establishing a RTP channel with the subscriber station 24 that initiated the multicast paging message and step 398 represent instructing the web server to prompt the subscriber to begin the multicast paging message.

Step 400 represents multicasting the message to the session group utilizing the multicast module 231 and step 402 represents instructing the voice mail module to terminate the multicast, build an audio file, and send the audio file by email to each recipient that was added to the email list at either step 404 or 406.

Figure 10H:
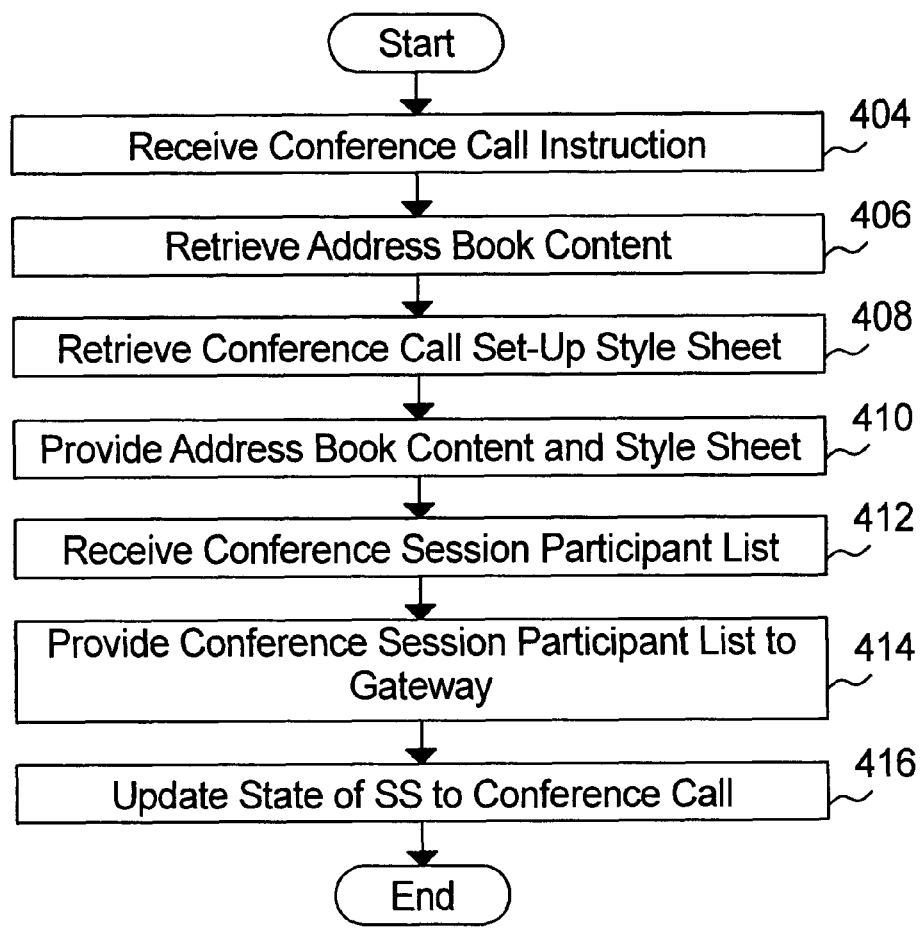

The flowchart of FIG. 10*h* represents steps performed by the web server 230 upon receiving a subscriber indication of a command to initiate an audio or an audio/video conference call from a subscriber station 24. The subscriber station may detect such a subscriber indication by various means, such as by subscriber activation of the conference call control 502 on the touch panel 72 of FIG. 11*b* or by activation of a button 92 corresponding to the conference call menu selection on the display screen 50 of FIG. 11*a*. Step 404 represents the web server 230 receiving such an indication from a subscriber station 24.

Step 406 represents retrieving the subscriber's address book content 249 from the email files 247 and step 408 represents retrieving a "select conference session participants" that corresponds to the subscriber interface of the subscriber station 24 from the style sheets 241 in the storage 235. Step 410 represents providing both the address book content and the style sheet to the subscriber station 24 for display.

Step 412 represents receiving subscriber selection of participants for the conference call. FIG. 11*e* represents an exemplary display of the address book for selection of conference call participants on the touch panel 72. The subscriber station may detect subscriber activation of the touch panel 72 to "highlight" conference call participants and indicate that selection is complete by activating a finished control 512. Upon activation of the finish control, the subscriber station will provide the subscriber selection of participants to the web server 230.

Step 414 represents providing the conference session participant list to the packet audio/video gateway 232 and step 416 represents updating the state of the subscriber station 24 to a conference call state.

After receiving the session participant list from the web server 230, the packet audio/video gateway 232, or more specifically the call signaling module 227 (FIG. 3) will establish applicable audio and video communication channels with those subscriber stations 24 that are serving subscriber devices associated with the participants in accordance with the steps discussed with respect to FIG. 12*a*. With the communication channels open, the packet voice gateway 232 will activate the conference mix module 237 to begin mixing the audio streams from each subscriber station 24 participating in the call. The packet voice gateway will also report the status of each participant to the web server 230. More specifically, the status will include an indication of whether each session participant is connected to the conference or is inactive (not connected to the conference. As will be discussed later, the status may also indicate whether the participant has stopped providing an active audio stream (e.g. put his or her phone on mute) and may indicate whether the conference mixing module has suspended sending a conference mix to the participant (e.g. the packet audio/video gateway 232 has placed a particular participant on hold for a time period to so that others can converse without such participant hearing the conversation).

Figure 10J:
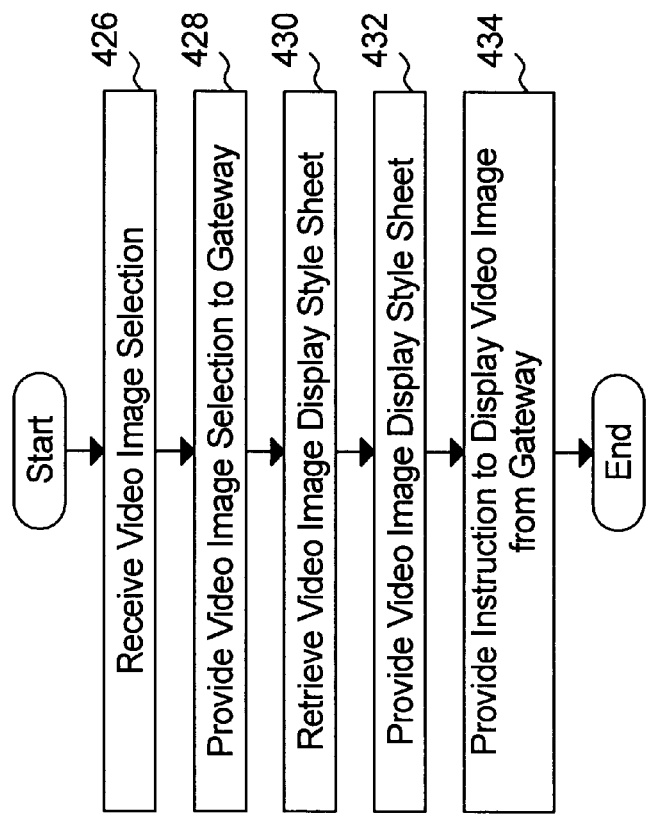
Figure 10I:
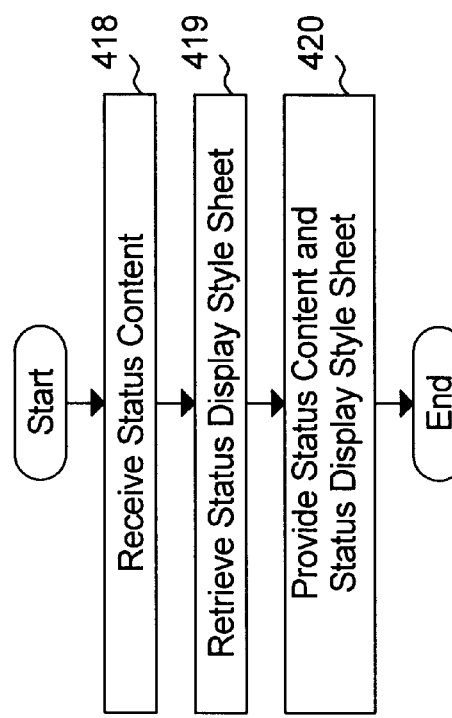

The flowchart of FIG. 10*i* represents steps performed by the web server application 230 upon receiving conference status content from the packet audio/video gateway 232. Step 418 represents receipt of the status content. Step 419 represents retrieving a "status" style sheet form the style sheets 241 in the storage 235 and step 410 represents providing the status content and the style sheet to at least the initiating subscriber station 24 and optionally, to other subscriber stations 24 participating in the conference call. It should be appreciated that the steps for the flowchart of FIG. 10*i* may be repeated several times during the duration of a conference call as the status of each participant changes.

Figure 11F:
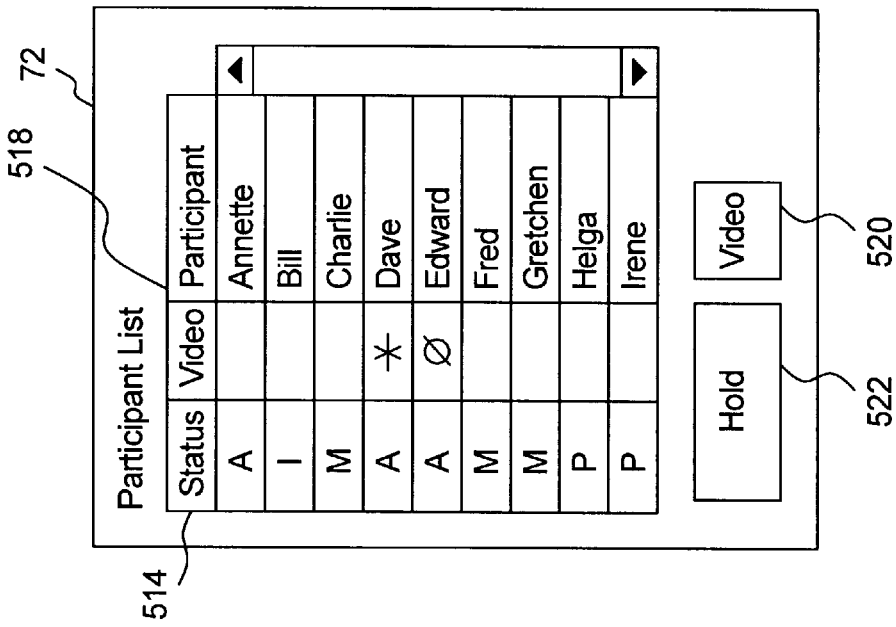
Figure 11E:
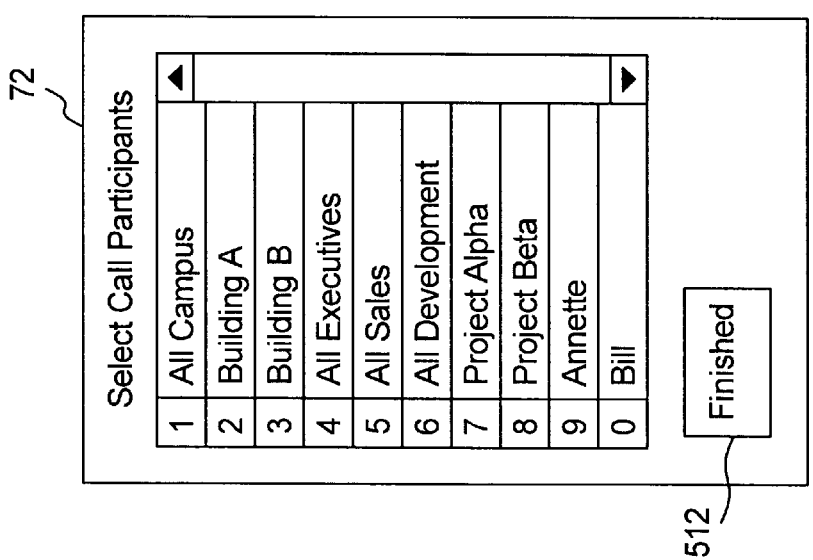

FIG. 11f represents an exemplary display of the status of each participant on the touch panel 72. The display includes a vertical listing of each participant and an indication of the participants status in a column 514. An "A" indicates that the participant is active (e.g. sending a non-mute audio stream and receiving a conference mix audio stream). An "I" indicates that the participant is not on the conference call. A "M" indicates that the participant has muted his or here telephone and is not sending an audio stream. An "H" indicates that the participant has been placed on hold by the initiating subscriber station and is not receiving a conference mix.

The display also includes a video indication column 516. This column indicates which participants are not sending a video image signal to the packet voice/video gateway 232 (e.g. the "φ" symbol). Because the subscriber may select which of the participants to view during a video conference, the video column 516 will also indicate the subscribers selection of the video image to view if the subscriber activates the video control 520. In the exemplary display, the "*" symbol associated with Dave indicates that the subscriber would view the video image provided by Dave's subscriber station 24 upon activating the video control 520. The subscriber may change such selection by utilizing the controls of the touch panel 72. Upon detecting activation of the video control, the communicating subscriber station will report the indication to the web server application 230.

The display also includes a hold control 522. The initiating subscriber may indicate his or her desire to place a participant(s) on hold status by highlighting the participant (s) and activating the hold control 522. Upon detecting activation of the hold control 522, the subscriber station will report the indication to the web server application 230. Upon receiving the indication, the web server application 230 will provide the indication to the packet voice/video gateway 232 which will place the selected participant(s) on hold status and return updated status content to the web server application 230.

The flow chart of FIG. 10j represents steps performed by the web server 230 upon receiving a subscriber indication of a video image selection from a subscriber station 24. Step 426 represents such receipt by the web server 230. Step 428 represents providing the video image selection to the packet voice/video gateway 232. The packet voice/video gateway 232 will then begin relaying the selected video image to the subscriber station. Step 430 represents the web server application 230 retrieving a style sheet for the display of the video image. Step 432 represents providing the style sheet to the subscriber station 24 and step 434 represents providing instructions to display the video image received from the packet voice/video gateway 232 in conjunction with the style sheet.

Figure 11H:
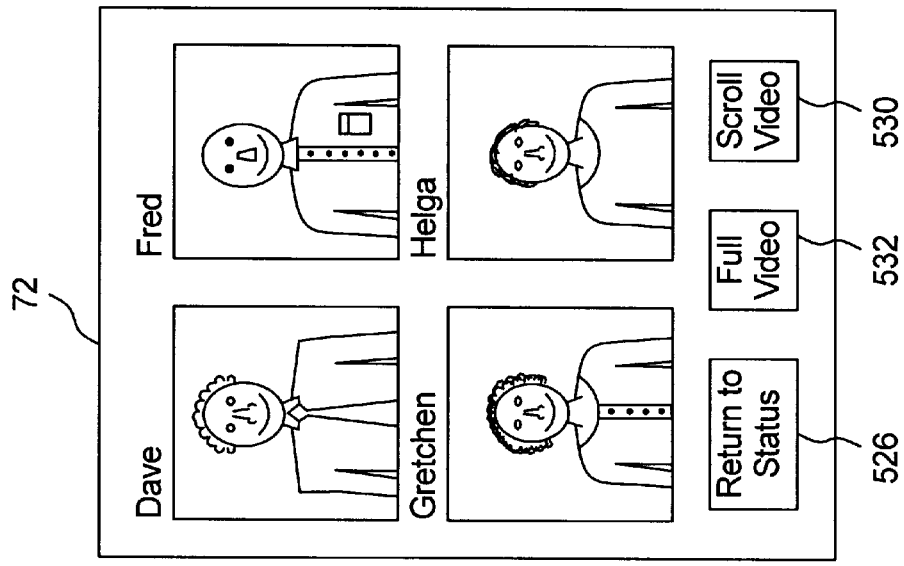
Figure 11G:
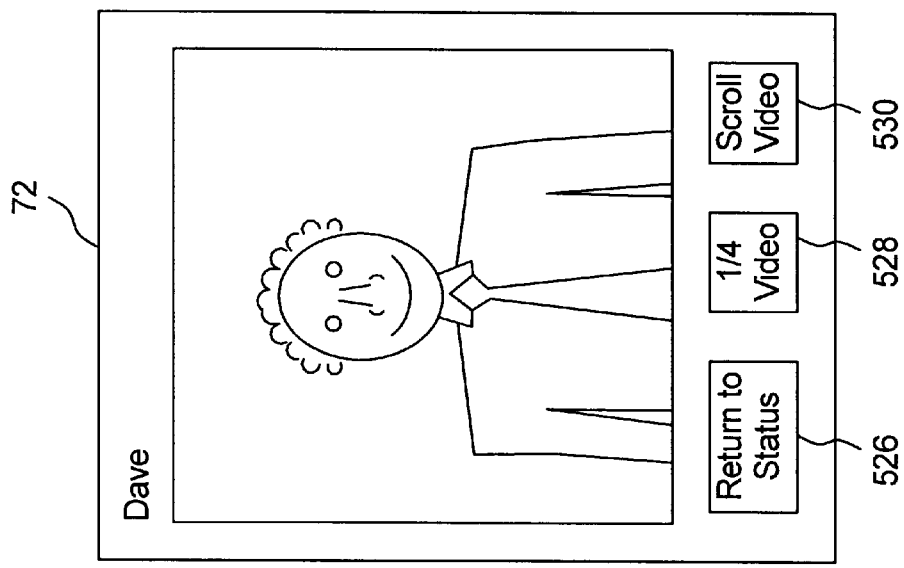

FIG. 11g represents an exemplary display of a single video image on the touch panel 72. The display will include a control to return to the status page which, when activated, will cause the subscriber station 24 to return to the display of FIG. 11f.

The display will also include a scroll video control 530 which, when activated will cause the subscriber station 24 to report such activation to the web server 230. The web server 230 perform the steps discussed with respect to FIG. 10 with the selected image scrolled by one video image.

The display will also include a ¼ video control 528 which, when activated will cause the subscriber station 24 to report such activation o the web server application 230. The web server application will perform the steps discussed with respect to FIG. 10 but the packet voice/video gateway 232 will provide a mixed video image comprising each of four video images arranged in the four corners of the display as represented by FIG. 11h.

From any of the displays associated with the conference call (e.g. FIG. 11e, FIG. 11f, FIG. 11g, and FIG. 11h, termination of the call will cause the subscriber station 24 to return to the main menu as represented by FIGS. 10a or 10b.

It should be appreciated that the systems and methods of the present invention provides enhanced conference call services to subscribers to the multimedia communication management system of the present invention. Although the invention has been shown and described with respect to certain preferred embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of the modular multi-media communication management system of the present invention. The present invention includes all such equivalents and modifications, and is limited only by the scope of the following claims.

What is claimed:

1. A multi-media communication management system for operation with a subscriber station that includes an interface for coupling to a subscriber device, the subscriber device capable of coupling to a wireless communication service provider and downloading from a first remote email server, over a wide area network communication link, first subscriber emails that are addressed to a first email account associated with the first remote email server, the multimedia communication management system comprising:

a network communication circuit for communication with the subscriber station;

a service provider network interface for communication with a service provider multi-media communications network;

subscriber device email interface means for establishing communications with the subscriber station at which a subscriber device is coupled and receiving the first subscriber emails downloaded by the subscriber device from the first remote email server over the wide area network communication link;

a subscriber email client, coupled to the network communication circuit and the service provider multimedia communications network, comprising:
means for establishing communications with a second remote email server coupled to the service provider multi-media communications network and downloading second subscriber emails from the second remote email server, the second subscriber emails being emails that are addressed to a second email account associated the second remote email server;
means for generating inbox content comprising both the first subscriber emails and the second subscriber emails; and
means for providing the inbox content to the subscriber station for display on a display associated with the subscriber station.

2. The system of claim 1, further including:

an email storage file; and wherein the subscriber email client further comprises:
means for storing the inbox content in the email storage file.

3. The system of claim 2, wherein the means for providing the inbox content to the subscriber station further comprises:

means for providing instructions to the subscriber station to effect the transfer of the inbox content to the subscriber device.

4. The system of claim 2, wherein the means for providing the inbox content to the subscriber station further comprises:
means for generating an HTML document that includes the subscriber content in a layout format selected from one of a plurality of layout formats, the layout format suitable for display on the display associated with the subscriber station.

5. The system of claim 4, wherein the display associated with the subscriber station comprises a subscriber device display operating under control of the subscriber device.

6. The system of claim 2, wherein the inbox content comprises a plurality of tagged content messages, each tagged content message including a content value and a tag identifying the significance of the content value.

7. The system of claim 6, wherein the means for providing the inbox content to the subscriber station further comprises:
means for selecting display layout control instructions from a plurality of display layout control instructions, the display layout control instructions being suitable for display of each content value on the display associated with the subscriber station.

8. The system of claim 7, wherein:
the tagged content messages are XML messages; and
the display layout control instructions are an XML style sheet.

9. A multi-media communication management system for operation with a subscriber device, the subscriber device capable of coupling to a wireless communication service provider and downloading from a first remote email server, over a wide area network communication link, first subscriber emails that are addressed to a first email account associated with the first remote email server, the multi-media communication management system comprising:
a service provider network interface for communication with a service provider multi-media communications network;
a docking interface for supporting and coupling to the subscriber device;
subscriber device interface means for establishing communications with the subscriber device when the subscriber device is supported in the docking interface; the subscriber device interface means comprising:
means for receiving the first subscriber emails downloaded by the subscriber device from the first remote email server over the wide area network communication link;
means for providing display content to the subscriber device for display on a subscriber device display screen;
means for establishing communications with a second remote email server coupled to the service provider multi-media communication network and downloading second subscriber emails from the second remote email server, the second subscriber emails being emails that are addressed to a second email account associated with the second remote email server;
means for generating inbox content comprising both the first subscriber emails and the second subscriber emails; and
means for generating the display content, the display content including the inbox content.

10. The system of claim 9, further including:
an email storage file; and
wherein the means for generating inbox content further comprises:
means for storing the inbox content in the email storage file.

11. The system of claim 10, wherein the subscriber device interface means comprises means for transferring the inbox content to the subscriber device.

12. The system of claim 9, wherein the means for generating the display content comprises:
means for generating an HTML document that includes the inbox content in a layout format selected from one of a plurality of layout formats, the layout format suitable for display on the subscriber device display screen.

13. The system of claim 9, wherein the inbox content comprises a plurality of tagged content messages, each tagged content message including a content value and a tag identifying the significance of the content value.

14. The system of claim 13, wherein the means for generating the display content further comprises:
means for selecting display layout control instructions from a plurality of display layout control instructions, the display layout control instructions being suitable for display of each content value on the subscriber device display screen.

15. The system of claim 14, wherein:
the tagged content messages are XML messages; and
the display layout control instructions are an XML style sheet.

16. A method of communication management in a system for operation with a subscriber station that includes an interface for coupling to a subscriber device, the subscriber device capable of coupling to a wireless communication service provider and downloading from a first remote email server, over a wide area network communication link, first subscriber emails that are addressed to a first email account associated with the first remote email server, the method comprising:
establishing communications with the subscriber station at which a subscriber device is coupled;
receiving the first subscriber emails downloaded by the subscriber device over the wide area network communication link;
establishing communications with a second remote email server coupled to the service provider network;
downloading second subscriber emails from the second remote email server, the second subscriber emails being emails that are addressed to a second email account associated with the second remote email server;
generating inbox content comprising both the first subscriber emails and the second subscriber emails; and
providing the inbox content to the subscriber station for display on a display associated with the subscriber station.

17. The method of claim 16, further comprising:
storing the inbox content in an email storage file.

18. The method of claim 17, wherein the step of providing inbox content to the subscriber station comprises:
providing instructions to the subscriber station to effect the transfer of the inbox content to the subscriber device.

19. The method of claim 16, wherein the step of providing the inbox content to the subscriber station comprises:
generating an HTML document that includes the subscriber content in a layout format selected from one of a plurality of layout formats, the layout format suitable for display on the display associated with the subscriber station.

20. The method of claim 19, wherein the step of providing the inbox content to the subscriber station for display on a display associated with the subscriber station includes providing the inbox content to the subscriber station for display on a subscriber device display operating under control of the subscriber device.

21. The method of claim 16 wherein the step of providing the inbox content to the subscriber station comprises:

generating a plurality of tagged content messages, each tagged content message including a content value and a tag identifying the significance of the content value.

22. The method of claim 21, wherein the step of providing the inbox content to the subscriber station further comprises:

selecting display layout control instructions from a plurality of display layout control instructions, the display layout control instructions being suitable for display of each content value on the display associated with the subscriber station.

23. The method of claim 22, wherein:

the tagged content messages are XML messages; and the display layout control instructions are an XML style sheet.

24. A method of communication management in a system for operation with a subscriber device, the subscriber device capable of coupling to a wireless communication service provider and downloading from a first remote email server, over a wide area network communication link, first subscriber emails that are addressed to a first email account associated the first remote email server, the method comprising:

establishing communications with the subscriber device through a docking interface when the subscriber device is supported in the docking interface;

receiving the first subscriber emails through the docking interface;

establishing communications with a second remote email server through a network interface;

downloading second subscriber emails from the second remote email server, the second subscriber emails being emails that are address to a second email account associated with the second remote email server through the network interface;

generating inbox content comprising both the first subscriber emails and the second subscriber emails;

generating display content, the display content including the inbox content; and providing the display content to the subscriber device for display on a subscriber device display screen.

25. The method of claim 24, further comprising:

storing the inbox content in an email storage file.

26. The method of claim 24, further comprising providing the inbox content to the subscriber device.

27. The system of claim 24, wherein the step of generating display content comprises:

generating an HTML document that includes the inbox content in a layout format selected from one of a plurality of layout formats, the layout format suitable for display on the subscriber device display screen.

28. The method of claim 24, wherein the step of generating display content comprises:

generating a plurality of tagged content messages, each tagged content message including a content value and a tag identifying the significance of the content value.

29. The method of claim 28, wherein the step of generating display content further comprises:

selecting display layout control instructions from a plurality of display layout control instructions, the display layout control instructions being suitable for display of each content value on the subscriber device display screen.

30. The method of claim 29, wherein:

the tagged content messages are XML messages; and the display layout control instructions are an XML style sheet.

* * * * *